(12) United States Patent
Jia

(10) Patent No.: US 12,302,235 B2
(45) Date of Patent: May 13, 2025

(54) COORDINATED WIRELESS NETWORK AND BACKHAUL NETWORK SLICING

(71) Applicant: AT&T Intellectual Property I, L.P., Atlanta, GA (US)

(72) Inventor: Yupeng Jia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 455 days.

(21) Appl. No.: 17/733,215

(22) Filed: Apr. 29, 2022

(65) Prior Publication Data

US 2023/0354169 A1 Nov. 2, 2023

(51) Int. Cl.
| | |
|---|---|
| *H04L 12/00* | (2006.01) |
| *H04W 48/16* | (2009.01) |
| *H04W 48/18* | (2009.01) |
| *H04W 88/14* | (2009.01) |

(52) U.S. Cl.
CPC ........... *H04W 48/18* (2013.01); *H04W 48/16* (2013.01); *H04W 88/14* (2013.01)

(58) Field of Classification Search
CPC ............. H04W 28/0247; H04W 48/18; H04W 48/16; H04W 88/14; H04W 24/02; H04L 41/12; H04L 63/0869; H04L 41/5009
USPC .......................................................... 370/329
See application file for complete search history.

(56) References Cited

U.S. PATENT DOCUMENTS

| | | | | |
|---|---|---|---|---|
| 11,265,220 | B1 * | 3/2022 | Kushwaha | ............... H04L 41/12 |
| 2018/0176900 | A1 * | 6/2018 | Rong | ................ H04W 28/0247 |
| 2018/0242304 | A1 * | 8/2018 | Rong | ................ H04W 28/0247 |
| 2018/0343249 | A1 * | 11/2018 | Hahn | ................... H04L 63/0869 |
| 2021/0195541 | A1 * | 6/2021 | Wei | ....................... H04W 72/21 |
| 2022/0060277 | A1 * | 2/2022 | Wei | ....................... H04L 1/0007 |
| 2022/0086897 | A1 * | 3/2022 | Wei | ................... H04W 74/0833 |
| 2022/0110112 | A1 * | 4/2022 | Wei | ................... H04W 72/0453 |
| 2023/0043362 | A1 * | 2/2023 | Kita | ..................... H04L 41/5009 |

FOREIGN PATENT DOCUMENTS

CN 108174394 A * 6/2018 ............ H04W 24/02

OTHER PUBLICATIONS

Jia, Yupeng. "Service Differentiation at an Access Point Device" U.S. Appl. No. 17/512,491, filed Oct. 27, 2021, 59 pages.

* cited by examiner

*Primary Examiner* — Frantz Coby
(74) *Attorney, Agent, or Firm* — Guntin & Gust, PLC; Miyoung Shin

(57) ABSTRACT

Adaptive grouping of an access point (AP) slice with other computing resource slices is disclosed. Grouping of an AP slice can comprise grouping to a radio access network (RAN) slice, to a backhaul network (BH) slice, to a network core component (core) slice, or combinations thereof. The grouping can be based on end point device information, AP environment information, and/or user preference information. Coordinating or synchronization of AP, RAN, BH, core slices, or combinations thereof, can enable streamlining of migration of a device between an AP component to a RAN component. Moreover, slice coordination can enable efficient use of communication path resources tailored to needs of devices connecting to an AP device. A determined grouping can be modified before provisioning, or after provisioning, in response to changes in device demands, AP state, etc.

20 Claims, 10 Drawing Sheets

COORDINATED WIRELESS NETWORK AND BACKHAUL NETWORK SLICING

TECHNICAL FIELD

The disclosed subject matter relates to slicing of backhaul network resources and, more particularly, to adaptively grouping an access point slice, a radio access network slice, a backhaul network slice, a core network slice, or combinations thereof, to enable improved computing resource allocation in comparison to conventional technologies.

BACKGROUND

Next-generation mobility networks including 5G cellular systems are anticipated to enable disruptive digital transformation in the society that will enable people, machines, businesses, and governments with unprecedented capabilities to communicate and share information effectively. The demands on 5G can be high in terms of handling a variety of use cases associated with mobile-to-mobile and the 'internet of things' (M2M/IoT), augmented/virtual reality (AR/VR), telehealth, targeted mobile advertising, connected cars, etc. These new services can require a wide range of aggregate bit rates, low latencies, vehicular speeds, device types and device capabilities, device densities, etc., to provide consistent end user quality for a given service in heterogeneous environment. 5G network slicing can be used to allocate 5G resources to end devices.

DETAILED DESCRIPTION

Figure 1:
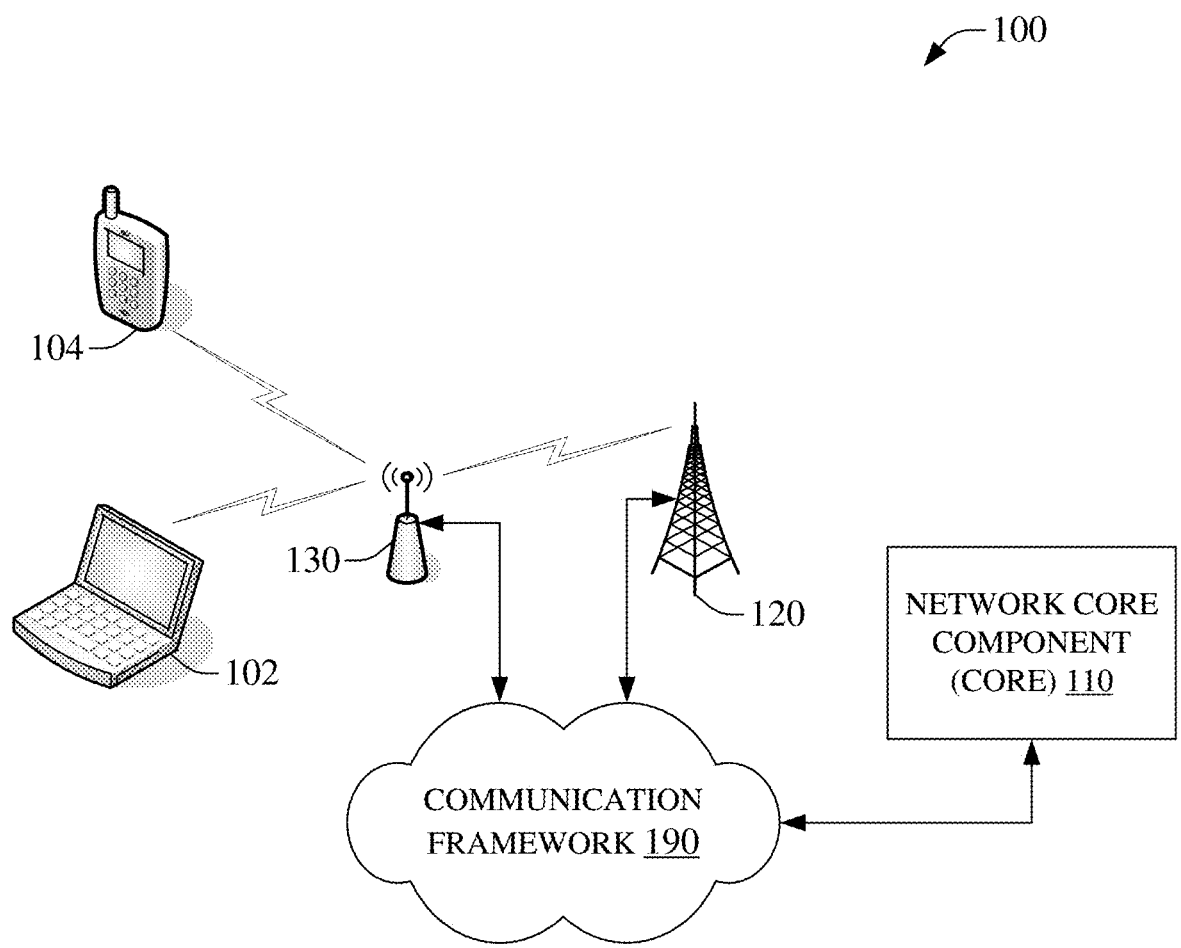
FIG. 1 is an illustration of an example system that can facilitate adaptive grouping of an access point slice, a backhaul slice, a RAN slice, and/or network core slice, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Coordinating radio access network (RAN) slices and network core (CN) slices has, to date, generally been highly beneficial in telecommunications systems. Extending slicing to other communications components comparing an end-to-end communications pathway, and therefore further extending the benefits of RAN slicing and core network slicing, can be highly desirable, e.g., as described in U.S. patent application Ser. No. 17/512,491, filed 27 Oct. 2021, which is hereby incorporated by reference herein in its entirety. In this regard, as mentioned, 5G and other evolving wireless network technologies can be highly resource intensive in terms of handling mobile-to-mobile, the 'internet of things' (M2M/IoT), augmented/virtual reality (AR/VR), telehealth, targeted mobile advertising, connected cars, and other services/technologies. These services/technologies can require a wide range of aggregate bit rates, low latencies, device types and device capabilities, device densities, etc., to provide consistent end user quality for a given service in a heterogeneous networking environment. Further, home and/ or enterprise access point (AP) wireless networks, such as provided by local wireless APs, micro-cells, nano-cells, pico-cells, etc., as compared to public access cellular-type wireless systems, can also demonstrate a lack of functionality and adaptivity in providing granular services to end point devices based on service types, applications, security/ privacy, etc. As an example, data traffic typically does not support differentiating between time-sensitive, mission critical services, and other services. Moreover, conventional AP data does not support interworking with cellular/wireless network slicing. As such, the more end point devices connecting to an AP network, generally the slower the average speed for each end point device and adding more devices then bogs down other devices. Where modern wireless network systems can be expected to increasingly support more devices, these devices will require improved connectivity, e.g., as part of internet of things (IOT), proliferation of personal wireless devices, etc., to local AP network(s), it can be desirable to increase availability and scalability of AP network(s) and interoperability with RAN network(s).

Moreover, backhaul network slicing has previously not been employed, see U.S. patent application Ser. No. 17/512, 491, filed 27 Oct. 2021, for example. However, the benefits of slicing AP resources can be frustrated where a backhaul network is not correspondingly sliced. As an example, a backhaul connection between an AP and a CN can be unsliced and first communications via the backhaul connection can compete with second communications being carried by the backhaul connection, e.g., streaming a high bandwidth movie by a first UE can compete for backhaul resources also needed to support a high bandwidth teleconference by a second UE. It can readily be appreciated that similar benefits from slicing AP resources can be achieved via backhaul slicing. Returning to the above example, the second UE can be allocated an AP slice and a backhaul slice that has improved performance in comparison to non-sliced AP and backhaul resource usage. In this example, the second UE can be associated with a higher priority than the first UE, whereby a backhaul slice can be designated for the second UE that can avoid competing for resources of another backhaul slice designated for use by the first UE, e.g., the first UE can be given a smaller slice of the backhaul resources to use, thereby freeing up backhaul resources that can be designated in a backhaul slice for use by the second UE. This example can illustrate partitioning of backhaul resources into backhaul slices. Additionally, backhaul slicing can enable adaptable use of backhaul resources, tiered pricing, merging/shedding of BH slices, etc. As an example, a backhaul connection from a corporate router component can be sliced to provide different slice capacities, for example based on the type of endpoint device connecting to an AP connected to the example corporate route component. In this example, the BH slice between the router and a CN can be adapted, for example, to increase or decrease the bandwidth of a BH slice based on an application being used on an example endpoint device, e.g., not just the end point device type, but also the end point device usage, can be considered in adapting the BH slice to efficiently accommodate communications between the example router and CN resource. In some embodiments, for example, with a router at a coffee shop, e.g., supporting public access to a particular backhaul resource(s), the BH slicing can provide different service tiers, different costs, etc., e.g., a UE can use a 'smaller' BH slice for a first cost, but can have the option to use a 'larger' BH slice for a second cost, etc. Further, underutilized BH resources can be made available more broadly with BH slicing. As an example, a residence with first BH resources that are underutilized during the day when the homeowner is at work, can be sliced to provide the excess BH resources to a neighbor that can be working from home and in need of additional BH resources. In this example, the sliced off excess BH resources can be accessed by the neighbor, for example, for a fee on a temporary basis. The 'excess' BH resources can be determined intelligently by a BH slicing component (BSC), for example, where the excess occurs regularly, such as Monday to Friday between 8 am and 6 pm, the excess can be automatically sliced and made available for other users via a background auctioning process, etc. Moreover, the BH slice(s) can be subject to security rules, authentication rules, etc., e.g., the traffic of the example work from home user moved over the BH slice(s) derived from the excess BH resources of another user can be monitored, for example, to prevent the movement of illicit or illegal content across the rented/borrowed/shared BH slice(s). Numerous other examples of the benefits of BH slicing are readily appreciated by one of skill in the related arts and all such examples are considered within the scope of the instant disclosure even where not explicitly recited for the sake of clarity and brevity.

Given that network architecture with a monolithic set of standard mobility network functions can be extremely complex and expensive to deploy in a manner that can be able to meet the demanding performance requirements for a wide variety of mobility services, network slicing concepts can enable use of standardized network elements and functions in a manner that can be dynamically re-configurable within an AP network, a RAN network, a backhaul (BH) network, core components of a core network (CN), etc. As such, a network operator architecture can create and deliver a given mobility service via a coordinated slicing of various parts of the communications pathway, e.g., combinations of slices of one or more of an AP, RAN, backhaul network, core network, etc. Logically slicing an AP, RAN, backhaul network, core network, etc., into multiple virtual networks can enable designation of and/or optimization of a slice(s), group(s) of slices, etc., to meet dynamically changing resource needs, demands, expectations, etc. Given the scarce physical radio resources of an AP, RAN, backhaul network, core network, and their allocations and utilizations in space domains, frequency domains, and time domains, it can be possible to define end-to-end network slicing wherein a CN slice(s) is intelligently paired with one of more AP slice(s), backhaul network slice(s), and/or RAN slice(s) to adaptively define an end-to-end network-on-demand for services employing differing application(s) and/or service(s), business agreement(s), etc. Moreover, handover between an AP and a RAN, and/or between APs and RANs, can be facilitated, e.g., an AP slice and a RAN slice can be selected to facilitate movement of an end point device between an AP and a RAN, which can include moving from a first AP to a first RAN, from a first RAN to a first AP, from a first AP to a second AP, from a first RAN to a second RAN, etc.

Pairing, grouping, binding, etc., of slices can adaptively couple a RAN slice(s), an AP(s) slice, a backhaul network slice(s), hereinafter a 'backhaul slice(s)' for simplicity, a CN slice(s), or combinations thereof, to provide desired or indicated features, performance, cost, efficiency, etc. In contrast to random pairing between slices, intelligent grouping of slices can allocate a resource(s) in real time or near real time, and in a manner that can reflect business goals. Moreover, intelligent slice allocation can accommodate updating of a slice(s), substitution of a slice(s), adding a new slice(s), removing a slice(s), or nearly any other adaptation of a combination of slices comprising a communication pathway being employed by an end point device. The disclosed subject matter can generally be discussed in terms of user equipment (UE) end point devices and the term UE can generally be used to indicate any end point device(s) for brevity. It is noted that the term UE can generally be regarded as being inclusive of non-user equipments, such as some IOT devices, etc., unless explicitly or implicitly indicated otherwise, e.g., any and all end point devices can be referred to as UEs herein, unless it is clear from the context or written description that the term UE should be more narrowly interpreted as specifically referring to a more limited definition of a user equipment or non-user equipment. Moreover, end-to-end network slicing can be referred to as 'network slicing' for simplicity, and a network slice can comprise an AP slice(s), a RAN slice(s), backhaul slice(s), a CN slice(s), a combination thereof, etc., and can be distinct from CN slicing that does not consider a RAN slice AP slice, backhaul slice, or combination thereof, as distinct from RAN slicing that does not consider a CN slice, an AP slice, a backhaul slice, or combinations thereof, as distinct from AP slicing that does not consider a CN slice, an RAN slice, a backhaul slice, or combinations thereof, and as distinct from backhaul slicing that does not consider a CN slice, an AP slice, a RAN slice, or combinations thereof. Further, the disclosed subject matter can consider AP slicing in regard to compatibility with RAN-BH-CN slicing, e.g., the disclosed subject matter can enable coordination of AP slicing to facilitate moving a UE to a RAN-BH-CN slice group from, and based on, an AP-BH-CN slice group, rather than merely to some RAN-BH-CN group determined in the absence of AP slice parameters. Similarly, the disclosed subject matter can enable coordination of AP slicing to facilitate moving a UE from, and based on, a RAN-BH-CN slice group to an AP-BH-NC slice group, again rather than just selecting a RAN-BH-CN slice group determined in the absence of the AP slice parameters. In this regard, where RAN-BH-CN slice groups, AP-BH-CN slice groups, etc., may be known, the instant disclosure provides improvements by enabling coordination with AP slicing information.

Network slicing can transform a monolithic mobility networking architecture that has traditionally been used to service smartphones in the current wireless network provider industry. With the proliferation of new wireless technologies and next generation mobile devices, IOT devices, etc., the connectivity and communication models previously employed can be expected to rapidly evolve and drive the adoption of new services which were not possible before. Moreover, as network functions transform from a physical to a virtual domain, e.g., in a cloud centric environment, etc., this transformation can open up innovative opportunities to be able to design fully programmable mobile networks, for example, network that can deliver a 'micro-service architecture', etc. Programmable or adaptive network technology concepts can be applied to core networks and can extended to backhaul networks, radio access networks and/or AP networks, to provide tailored communication resources and create a robust network slicing concept that can work in a coordinated manner across various segments of a communication pathway(s).

Within a single frequency band for an AP device, services can be apportioned to one or more slice(s) that can be selectable in terms of their utilization in space, time, frequency domain, etc. Similarly, BH networks, RANs, and CNs can be sliced. Each such slice, and combinations of such slices, can be employed to provide different sets of services, e.g., based on UE requirements in a real-time or near real-time manner. Thus, dynamic spectrum management can enable spectral allocation via configurable slices of an AP, RAN, BH, CN, etc., wherein slice combinations can provide adaptable services to a UE. Slicing can enable provisioning of applications/services of one or more devices across one or more groups of devices with similar or identical characteristics, for example, narrow band IoT devices that can operate in a 200 kHz channel for infrequent and short data transmission, e.g., bursty communications, can employ an AP slice that can be narrow and temporally multiplexed to serve the one or more IOT devices. A corresponding BH slice(s) can be provisioned, for example, based on the AP slice(s), based on the type of UE, based on use of the UE, etc. An example IOT device(s) can be a device(s) such as, but not limited to, a sensor, utility meter that can wake up to report their readings and then return to an extended sleep mode, parking meter that reports upon use then returns to a sleep mode, etc. Similarly, another example AP slice, BH slice, etc., can provide greater bandwidth to other types of UEs, e.g., computers, tablets, smartphones, video doorbell systems, etc., that can be different from the example slices allocated for the aforementioned example IOT devices.

Moreover, an example AP slice, BH slice, etc., can be re-allocated, for example, as a standalone resource, etc., combined with other slices per appropriate rules for aggregation, etc., to satisfy changing service conditions/requirements, e.g., where the AP slice, BH slice, etc., can be subsequently used to provide service to other devices including mobile broadband smartphones, more spectrum demanding classes of IoT devices, etc. An example AP slice, BH slice, etc., allocation can adapt in real-time, or near real-time, and can maintain a record of historical AP slice, BH slice(s), etc., allocation(s), grouping(s), etc., to facilitate future use by the example less demanding IoT devices as they are deployed, though subject to prompt adaptation based on current spectral/performance demands. As such, analysis of information pertaining to the device/service using the spectrum, in addition to analysis of the AP slice(s), a BH slice(s), a RAN slice(s), a CN slice(s), etc., can therefore enable intelligent use of historical information to facilitate allocation of an end-to-end network slice combining one or more of the segment slices, which can then be adapted based on the demands/performance in the present use of the network slice. In an embodiment, the analysis can be performed based on the historical information and current use prior to allocation of the network slice, e.g., AP, RAN, BH, CN slice combination(s). In an embodiment, the historical information can be employed to select an initial network slice that can then subsequently be adapted based on the current use. Adaptation of a network slice can comprise adaptation of an AP slice, a RAN slice, a BH slice, a CN slice, or combinations thereof. Moreover, the adaptation can be used to update stored historical slice data. Adaptation of the AP slice can include changes to the time, frequency, space, etc., of the AP slice, merging AP slices, divesting AP slices, ranking AP slices, ordering AP slices, shifting an AP slice in frequency, time, space, etc., coordinated use with another AP slice, etc. Similarly, adaptation of a RAN slice, BH slice, and/or a CN slice can merge, divest, rank, order, coordinate use of, add/remove functionality to, etc., these other slices, e.g., adding/removing one or more virtual network function (VNF) to a CN slice, providing greater bandwidth by paralleling BH slices, etc. Adapting a slice can be performed in an automated manner, e.g., in a software deployed network (SDN), via network function virtualization (NFV), etc. As an example, intelligent selection of a slice can result in offloading non-critical traffic from a RAN slice to an AP slice, to a different RAN or CN slice, from a first AP slice to another AP slice, growing/shrinking a BH slice, selecting an alternate CN slice with different VNFs, etc. As an example, a selectable priority of services in a given location, a subscriber agreement parameter, historical use by a device requesting access to a service, planned/unplanned maintenance of an AP/RAN/BH/CN component, changes in use of networking resources, availability of alternate VNFs, etc., can cause adaptation of an AP slice or combination of an AP slice with a BH slice, a CN slice, a RAN slice, etc. As such, the disclosed subject matter can support service differentiation and resource segmentation that can provide improved customer satisfaction, for example, via adaptive AP resource segmentation, granular service differentiation for UEs, contextual selection of appropriate AP slice(s), enabling different tiers of security slices and/or privacy slices, automating interworking of AP slices with BH, RAN, and/or CN slices, for example, based on services, applications, indicated performance, historical use, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate adaptive grouping of an access point slice with a RAN slice and/or network core slice, in accordance with aspects of the subject disclosure. System 100 can comprise network core component (core) 110. Core 110 can be communicatively coupled, via communication framework 190, to radio access network (RAN) 120, access point (AP) 130, etc. Communication framework 190, for example, can comprise a sliceable backhaul connection between RAN 120 and core 110, such as a fiber optic connection between AP 130 and core 110, etc. In modern systems, communication framework 190 can be expected to comprise one or more modalities of communication technologies, e.g., fiber optic, digital subscriber lines, copper wiring, over-the-air optical connectivity, radio frequency connectivity, etc., and, as such, a connection between AP 130 and core 110 can traverse different communication modalities that can be owned, operated, etc., by one or more different entities, e.g., a phone line can connect AP 130 to a local exchange where communication can be converted to optical signals sent on fiber to other devices that eventually route communications to core 110. Similarly, communicating back to the example AP 130 can traverse the same or different modalities. Communication framework 190 can support backhaul slicing, e.g., communication framework 190 can be sliced based on various parameters that can correspond to a use (or intended use) of the portion of the communication pathway comprised in communication framework 190.

An end point device, e.g., a UE, can be communicatively coupled to AP 130 in example system 100. A UE can be laptop computer 102, smart phone 104, or nearly any other user or non-user device, e.g., an IOT sensor, a surveillance camera, a printer server, a television, a media server, a wireless audio device, a connected thermostat, a wireless smoke detector, tablet computer, laptop computer, video game console, sprinkler controller, lighting controller, smart doorbell, broadband gateway component, etc. Each end point device can request and be allocated wireless connectivity via an AP component, e.g., AP 130, etc. In some embodiments, one or more AP 130 can provide service area coverage jointly, for example, a residence can have multiple areas of wireless coverage provided by corresponding wireless nodes that can act as one or more AP 130. These areas of wireless coverage can comprise discreet areas, overlapping areas, etc. Accordingly, some apportionment of available AP resources can be facilitated in accord with the disclosed subject matter. In conventional systems, apportionment can include evenly dividing AP resources among all requesting UEs. This can result, for example, in a media server being provided with equivalent priority and resource access as a baby monitor, a humidity sensor on a deck weather station, and a smart doorbell even though each of these UEs can have different network resource needs. This conventional example of indiscriminate sharing of AP resources can result in inadequately serving some UEs that can otherwise be associated with higher priority. As an example, the media server can burden AP resources by streaming music at high quality which can result in congestion that can cause delay for a smart doorbell that might cause an occupant of a house to miss a notification that a package was just left at the door, exposing the package to potential theft. In another example, a child playing online video games and consuming a majority of shared bandwidth from an AP device can cause a parent's video conference to have latency issues and degraded performance. Similarly, making all services available to all UEs all the time can be inefficient. This situation can be paralleled in backhaul networks where conventional distribution of backhaul network resources can be less optimal, less efficient, more wasteful of resources, etc., than intelligent slicing of the BH resources based on use or intended use of a BH slice(s).

In system 100, AP 130 can comprise an AP slicing component that can provide adaptable AP resource segmentation and granular service differentiation between UEs. As such, the AP resources can be adaptively divided, for example to provide up to a fixed amount of AP resources. As an example, a percentage of total available AP resources, e.g., wireless bandwidth, can be apportioned to all IOT devices of a home, another percentage to a parent's devices, another percentage to children's devices, and some portion to guests or passersby. Within these example AP resource partitions, services can be made available with granularity, for example, in the IOT portion, a first slice can provide low latency that can be useful to end point devices such as smoke alarms, motion sensors, smart doorbell devices, etc., while a second slice in this same portion can have access to higher latency services that can be acceptable for sensors like precipitation sensors connected to an irrigation system, light sensors of an automatic window blind control system, etc. Similarly, in the example children's partition, slices can be generated that focus on video gaming, streaming video/music, etc. In these examples, the AP partition of the parent can remain unaffected by the use of other partitions, for example, the children streaming video can be inconsequential to the parent's AP partition.

Further, the slicing of the AP resources can enable contextual selection of an AP slice, slicing with different security tiers, slicing with different privacy tiers, etc. In an example, an AP partition can be 'larger', e.g., a greater percentage of total AP resources, during a first time period and 'smaller' during another time period. In this example, the previously mentioned children's AP partition can be made larger between 3 pm and 9 pm on weekdays to facilitate the kids increased use of AP resources for relaxation after school or to perform schoolwork, etc. In another example, providing a slice of the children's AP partition to a gaming system that was just activated can be associated with providing a slice adapted for gaming based on detecting a type of device for the gaming system, e.g., when the device is identified as a gaming system a gaming system slice can be provided from the children's partition. Similarly, detecting a UE is a baby monitor or security camera, for example, can result in slicing the AP resources with heightened security services to better protect access to data on that slice, e.g., more rigorous authentication services to access the data of that slice can be implemented to, for example, prevent video of the inside of a user's home from being more easily accessible than without the increased security of the slice.

In system 100, it can be appreciated that slicing at AP 130 can be accomplished independent of slicing at communication framework 190, RAN 120, or core 110. However, it can be beneficial to coordinate AP 130 slices with a BH slice(s), a RAN 120 slice(s), and a core 110 slice(s). As an example, an AP slice, a BH slice, a RAN slice, and a core slice can be comprised in a slice group that can provide first services at a first level of performance. In this example, AP 130 slicing that can emulate RAN 120 slicing can allow an AP-BH-CN slice group that can be the same as, or similar to a RAN- BH-CN slice group. In this regard, UE 104 can readily transition between AP 130 and RAN 120 with little to no change in the slice group performance. Similarly, UE 102 can transition form RAN 120 to AP 130 in a coordinated manner where AP 130 and RAN 120 are performing coordinated slicing, in conjunction with corresponding BH and/or CN slicing. As an example, a RAN 120 slice can provide a RAN slice with a first latency and a first bandwidth, wherein AP 130 can provide an AP slice with a second latency and a second bandwidth. In this example, where the first and second latencies and bandwidth are very different, there can be increased complexity in migrating a UE between AP 130 and RAN 120, in either direction. However, in this example, where the first and second latencies and bandwidths are similar or the same, then migration can be less complex. Further, in this example, where each of the first and second latencies and bandwidths of the slices of AP 130 and RAN 120 are both coupled to similar BH slices of communication framework 190, and to similar services in slices of core 110, this can reduce complexity of handing over a UE between the RAN and AP in comparison to the example AP slice being coupled to very different BH and/or core slices than the example RAN-BH-CN slice.

Generally speaking, a slice can be a virtualization of a physical network or component that can enable independent architecture, partitioning, and organization of computing resources within each slice. This can facilitate flexibility that is typically not readily available in a monolithic embodiment of interconnected physical network components. A physical AP can be sliced into virtual AP slices such that the one or more virtual AP slices can each be adapted according to corresponding characteristics, e.g., adapted to perform a specific type of communication or service better than a generic channel of a monolithic physical AP device. Similarly, a BH slice can also be a virtualization of a physical communication framework 190 resource(s). Also similarly, a CN slice can also be a virtualization of a physical core 110 resource. Further similarity can be appreciated for a RAN slice can be a virtualization of a physical RAN 120 resource. Typically, a slice, e.g., an AP, RAN, BH, and/or CN slice, can be considered self-contained with regard to operation, traffic flow, performance, etc., can have its own virtualized architecture and features, and can be individually provisioned in a network. The virtualization of physical network resources via slicing can simplify coordination of the self-contained nature of slices of defendant segments of a communication pathway, wherein creation, management, and operation of slices, can be tailored to a type of functionality, environment, service, hardware, etc., to enable efficient consumption of network resources of the physical network across various communication pathway segment(s). As examples, a first network slice can have a first bandwidth and a second network slice can have a different second bandwidth; a first network slice can have a different latency than a second network slice; a first network slice can employ different virtual functions, e.g., VNFs, than a second network slice, etc. As disclosed herein, selection of an AP slice(s), RAN slice(s), BH slice(s), CN slice(s), or combinations thereof, can provide benefit to a network by efficiently employing the corresponding resources of the end-to-end network, such as, in a end-to-end network where an AP is wirelessly connected to a RAN that is connected to a core via a backhaul link, as an example, by grouping a narrow spectral AP slice, with a narrow spectral RAN slice, with a correspondingly narrow BH slice, and with a CN slice that supports IoT devices via VNFs frequently employed by an IoT device, which can be more efficient than grouping a wide spectral RAN slice with the same AP, BH, and CN slices that can result in wasting the extra spectrum allocated via the wide spectral RAN slice. Other more nuanced examples are readily appreciated and considered within the scope of the presently disclosed subject matter even where not explicitly recited. As such, slicing can be based on aspects, characteristics, features, bandwidth, jitter, frequency, or nearly any other aspect of AP component 130, including a type of UE, an expected use of a UE, etc., including those not explicitly recited here for the sake of clarity and brevity. Similarly, RAN, BH, and/or CN slicing can relate to aspects, characteristics, features, virtualized functions, e.g., VNFs, or nearly any other aspect of RAN component 120, Communication framework 190, and/or CN component 110, including those not explicitly recited here for the sake of clarity and brevity.

UE information, e.g., device information 206, 306, 506, etc., corresponding to UE 104 UE 102, etc., can comprise information pertaining to a device that is expected to use, or is requesting provisioning of, an AP, RAN, BH, CN, or combined network slice. Device information can comprise a device identifier, device history information, an indication of device type/functionality, an indication of device radio parameters, a subscriber identifier associated with the device, an indication of what version of software is available on the device or in use by the device, etc. In an aspect, the device information can be employed to identify a device, user, subscriber, service, application, functionality, etc. In another aspect, the device information can also directly or indirectly indicate parameters for an AP, RAN, BH, CN, or combined network slice. The device information can further comprise information for devices other than the device itself, for example, device information can be employed to access historical use information stored on a remotely located storage device, e.g., data store 592, etc., core and/or backhaul network access subscriber contract parameters, e.g., via a network subscriber information component of CN 110, etc., or other corresponding information that can be employed in selecting an AP, RAN, BH, CN, or combined network slice. As a rudimentary example, a 'connected thermostat' can report data that is comparatively smaller than might be associated with data from a tablet computer hosting a video conference and, as such, can typically employ a narrower bandwidth connection than the example tablet computer. Accordingly, the example connected thermostat can be directed to a narrow AP slice of AP component 130. This can trigger provisioning of a corresponding performance BH slice of communication framework 190. Moreover, the example thermostat can employ different core network functionality than the example tablet computer, e.g., the tablet might use a billing function in relation to streaming-data while the example thermostat might have no need of such core network functionality. Accordingly, the example connected thermostat, connected via the example BH slice(s) of communication framework 190, can be directed to employ a CN slice having functionality, e.g., VNFs, etc., that are better tailored to the reporting of small bursts of intermittent data and that can avoid allocation of a CN slice that houses other extraneous VNFs, such as a mobile billing VNF, etc. This AP-BH-CN slice group can be correlated with an identity of the example connected thermostat, with the type of device of the example connected thermostat, etc., such that where the same device, e.g., thermostat, later requests a connection, the identity of the device can be used to access the previously allocated network slice, e.g., the AP-BH-CN slice group previously used, to afford rapid provisioning of the network slice. Similarly, where an example second connected thermostat requests a connection, device information of the second thermostat can comprise the device type, which, where it is the same/similar type as the first example connected thermostat, the device type information can be used to pair the same type of network slice for the second example connected thermostat as was previously used by the first example connected thermostat, even where the second thermostat is in another household with a different AP component than AP component 130, e.g., the first household can be used to facilitate provisioning in a second unrelated household based on the device type and historical slicing information. In similar examples, a UE can be a smartphone that can connect via an AP-BH-CN slice group that can be used to generate a RAN-BH-CN slice group to accommodate handover of the smartphone from AP 130 to RAN 120 with better service coordination than without the AP-BH-CN slice group information.

In embodiments, alternative AP, RAN, BH, CN, or combinations of slices can be available that may rank higher than a slice based solely on device information. As an example, a newer VNF can be available on a different CN slice than was previously used by the aforementioned example connected thermostat, such that this new VNF slice can be selected over the previously employed CN slice of the example slice group where the newer VNF is more highly ranked according to a corresponding metric. Accordingly, in some embodiments, potential AP, RAN, BH, CN, or combination slices can be sorted, ordered, ranked, selected, etc., to facilitate employing a preferred AP, RAN, BH, CN, or combination slice(s). As an example, a frequency of use, a performance measurement, a user satisfaction indication, etc., can be used to increase/decrease a ranking of an AP, RAN, BH, CN, or combined slice. Rankings, ordering, etc., of slices can evolve over time. In an example, a previously used network slice can be highly ranked, however, where the AP slice information indicates that the AP slice is no longer available, an alternate AP slice can be increased in rank above the previously used AP slice of the previously used network slice. Continuing this example, where the CN slice information indicates that the CN slice is highly burdened by other devices, the CN slice ranking can be decremented, which may result in selection of the same network slice despite decrementing the ranking of the CN slice portion or can result in selection of an alternative CN slice to pair, via the same/different BH slice, with the new AP slice replacing the previously used AP slice.

Provisioning of AP slices can be determined and initiated, in some embodiments, by AP component 130, e.g., AP component 130 can be independently capable of provisioning an AP slice. In other embodiments, AP component 130 can provision slices responsively, e.g., slicing determination can be made remote from AP component 130, communicated to AP component 130, and AP 130 can responsively provision the indicated AP slice. As an example, an AP router table can be updated based on information from core 110. In another example, RAN component 120 can communicate RAN slicing information to core 110 that can then communicate the RAN slicing information to AP component 130 to enable AP component 130 to emulate RAN slices of RAN component 120. Similarly, CN, BH, and RAN slices can be determined by AP component 130, by other components such as backhaul slicing component (BSC) 292, core slicing component (CSC) 212, etc., or combinations thereof. Numerous other examples are readily appreciated and are all within the scope of the instant disclosure even where not explicitly recited for the sake of clarity and brevity.

In some embodiments, an inference can be formed by a machine learning component, an artificial intelligence component, etc., which inference can be employed in determining, designating, sorting, ordering, ranking, etc., an AP, RAN, BH, CN, or combination slice(s). The machine learning component, the artificial intelligence component, etc., can be generally referred to as an inference component. The inference component can generate an expected result based on models, patterns, historical data, etc. As an example, an inference can be generated by an inference component of AP component 130 that can indicate that adapting a first network slice into a second network slice at 6 pm can facilitate improved end-to-end communication performance based on historical use patterns, devices then currently connected to AP component 130, communication framework 190 performance, etc. However, an alternative inference can be determined that a most recently used network slice is most preferred based on other information. Either of these inferences, or other inferences, can be determined based on machine learning, artificial intelligence systems, programming, rules, etc. As such, slice selection, grouping, ranking, ordering, sorting, etc., can be based on inferences of an inference component (not illustrated). In some embodiments, an inference component can be located remotely from AP component 130.

Figure 2:
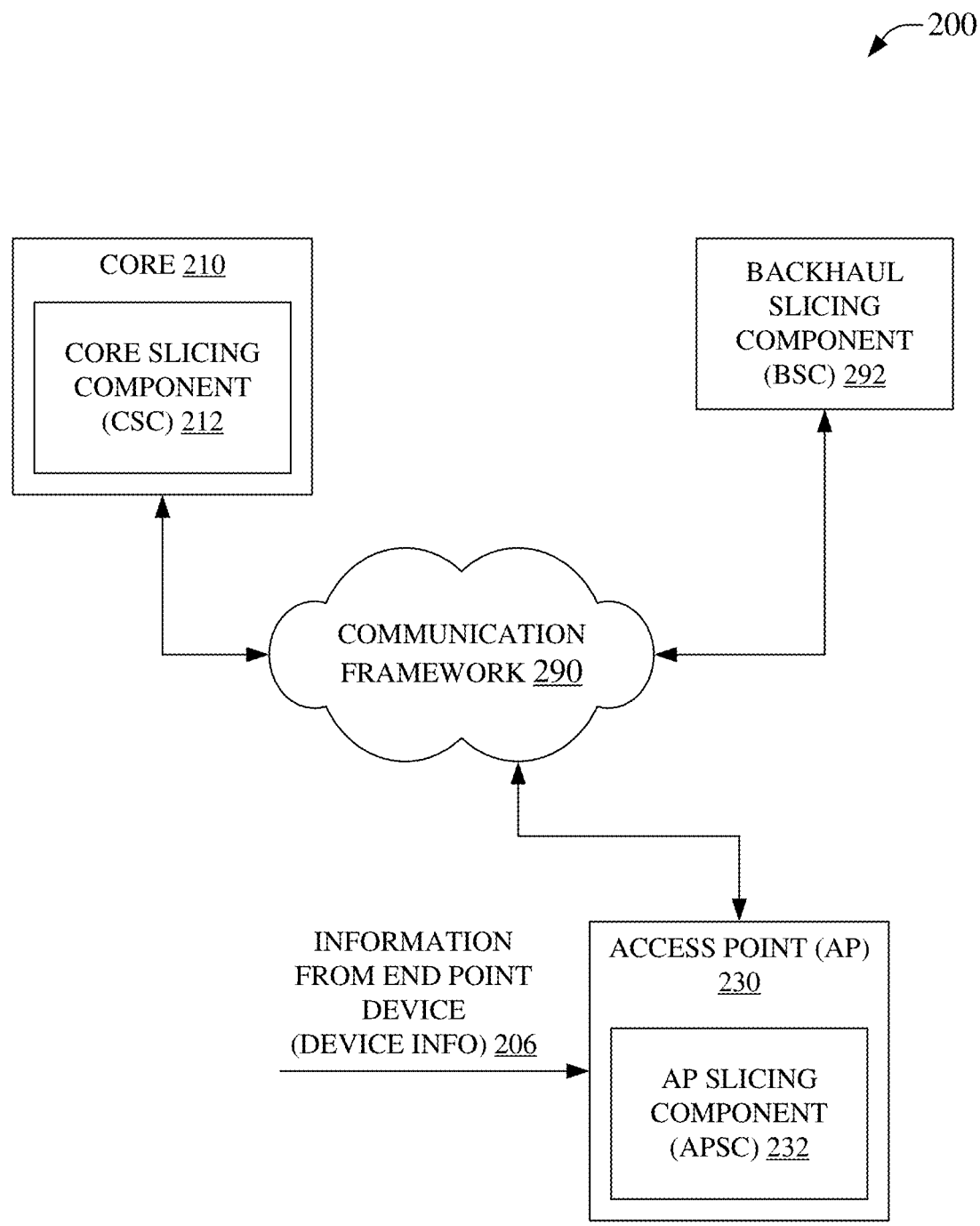
FIG. 2 is an illustration of an example system that can facilitate adaptive grouping of an access point slice, a backhaul slice, a RAN slice and/or network core slice based on device information, in accordance with aspects of the subject disclosure.

FIG. 2 is an illustration of a system 200, which can enable adaptive grouping of an access point slice(s) with a RAN slice(s), BH slice(s), core slice(s), or combination thereof, based on device information, in accordance with aspects of the subject disclosure. System 200 can comprise core 210 that can enable grouping of an AP slice with RAN, BH, and/or core slice(s). Core 210 can comprise core slicing component (CSC) 212. CSC 212 can support slicing of core computing resources, e.g., virtualizing core functions and resources specific to identified criteria. As an example, a core slice can comprise one or more of a group of VNFs made available via a portion of network resources that can be different than other possible core slices, which can allow access to those VNFs in a more efficient manner than without slicing. CSC 212 can provide a slice that can be provisioned via core 210 in a manner that can be combined with an AP slice, BH slice, RAN slice, etc.

An AP slice can be determined by AP slicing component (APSC) 232 that can be comprised in AP component 230. An AP slice can virtualize AP component functions and resources specific to identified criteria in a manner similar to slicing of core computing resources. APSC 232 can slice AP computing resources based on information from an end point device (device info) 206. In some embodiments, APSC 232 can receive core slicing information, BH slicing information, RAN slicing informing, etc., e.g., via communication framework 290, etc., and can determine an AP slice further based on the received slice(s) information. In some embodiments, APSC 232 can communicate AP slice information to CSC 212, backhaul slicing component (BSC) 292, etc., e.g., via communication framework 290, etc., to facilitate CSC 212 determining core slice(s) based on AP slice(s), to facilitate BSC 292 determining BH slice(s) based on AP slice(s), etc., wherein determining a slice can comprise identifying a slice parameter(s), generating a slice(s), selecting a slice(s), causing a slice(s), etc.

A BH slice can be determined by BSC 292. In some embodiments BSC 292 can be comprised in communication framework 290, core 210, AP 230, etc. A BH slice can virtualize communication framework 290 component functions and resources specific to identified criteria in a manner similar to slicing of core 210 computing resources, AP 230 resources, etc. BSC 292 can slice communication framework 290 resources based on information from an end point device (device info) 206. In some embodiments, BSC 292 can receive core, AP, RAN, or combination thereof slicing information, e.g., via communication framework 290, etc., and can determine an BH slice further based on the received core, AP, RAN, or combination slice information. In some embodiments, BSC 292 can communicate BH slice information to APSC 232, CSC 212, etc., e.g., via communication framework 290, etc., to facilitate CSC 212 determining core slices based on AP, BH, RAN, combination slices, to facilitate APSC 232 determining AP slices based on core, BH, RAN, combination slices, etc., wherein determining a slice can comprise identifying slice parameters, generating a slice, selecting a slice, causing a slice, etc.

As such, one or more of an AP slice, a BH slice, and a core slice can be coordinated to facilitate efficient interoperation. As an example, an AP slice can be determined that can implement a VNF that is comprised in a core slice and communicates data across a correspondingly slice of communication framework 290, e.g., a BH slice(s). As another example, a core slice can implement a VNF employed in an AP slice, again capable of employing a coordinated BH slice(s). In these examples, use of a matching VNF can be more efficient that employing an AP slice and a core slice that use different VNFs, and can also be more efficient than using a communication framework without intelligent BH slicing. As an example, a narrow AP slice and a narrow core slice communicating across a broad BH slice can underutilize the broad BH slice. As a further example, a broad AP slice and broad CN slice communicating across a narrow BH slice can experience bottlenecking of communication via the narrow BH slice. As such, intelligent BH slicing that is coordinated with AP and core slices can improve performance of an end-to-end network slice while remaining efficient and not wasting valuable backhaul network resources.

Device info 206 can comprise indicators of a UE type, a requested computing resource and/or VNF, a requested quality of service (QoS), a requested latency value, a requested throughput value, etc. As such, AP 230, via APSC 232, communication framework, via BSC 292, and core 210 via CSC 212, can correspondingly generate an AP, BH, core, or combination of slices that can be tailored to a UE computing resources request. As an example, a first AP slice can be generated for a UE that is an IOT type device that can be associated with a low volume of data throughput and comparatively higher acceptable latency than for a second AP slice that can be requested by a UE that can be a personal computer (PC) belonging to an account owner that can request a lower latency threshold and greater amount of bandwidth. This AP slice information can be leveraged, e.g., via BSC 292 and/or CSC 212, etc., to select correspondingly adapted BH and/or core slice(s).

An AP slice can be coordinated with a core slice and/or BH slice to enable the indicated level of allocated computing resource usage and functionality. In the preceding example, the AP slice for the IOT type device can be grouped with a BH slice and a core slice having slower communications links than another BH slice and core slice group that can correspond to the example second AP slice for the account holders PC. It can be appreciated that grouping the AP slice and/or BH slice for the example PC with a core slice relating to IOT devices can be less optimal than grouping the AP slice and/or BH slice for the PC with a core slice having VNFs for non-IOT devices. In system 200, APSC 232 is illustrated as being comprised in AP 230. However, in some embodiments, APSC 232 can be external to AP 230, e.g., comprised in another component on the AP 230 side of communications framework 290. In some embodiments, APSC 232 can be located on core 210 side of communications framework, or even in core 210, e.g., AP 230 can communicate, via communication framework 290, data to enable a remotely located APSC 232 to determine an AP slice and to communicate data to implement the determined AP slice back to AP 230 where the AP slice can be provisioned. However, in most implementations of example system 200, AP 230 comprising APSC 232 can enable distributed, rather than centralized, AP slice determination in a manner than can be more favorable than a centralized determination, e.g., many AP components that can utilize a local APSC 232 can distribute the computing resource cost of determining and provisioning corresponding AP slices at the many AP components in a manner that can be more efficient than communicating data across communication framework 290 to enable centralized AP slice determinations that are then sent back to the many AP components. Similarly, BSC 292 can be comprised in components other than those illustrated in system 200, e.g., as shown in system 300 as an alternative to BSC 392, BSCs 393, 394, 395, and 396, combinations thereof, etc., can be implemented. Likewise, CSC 212 can be comprised in other components than illustrated in system 200.

Figure 3:
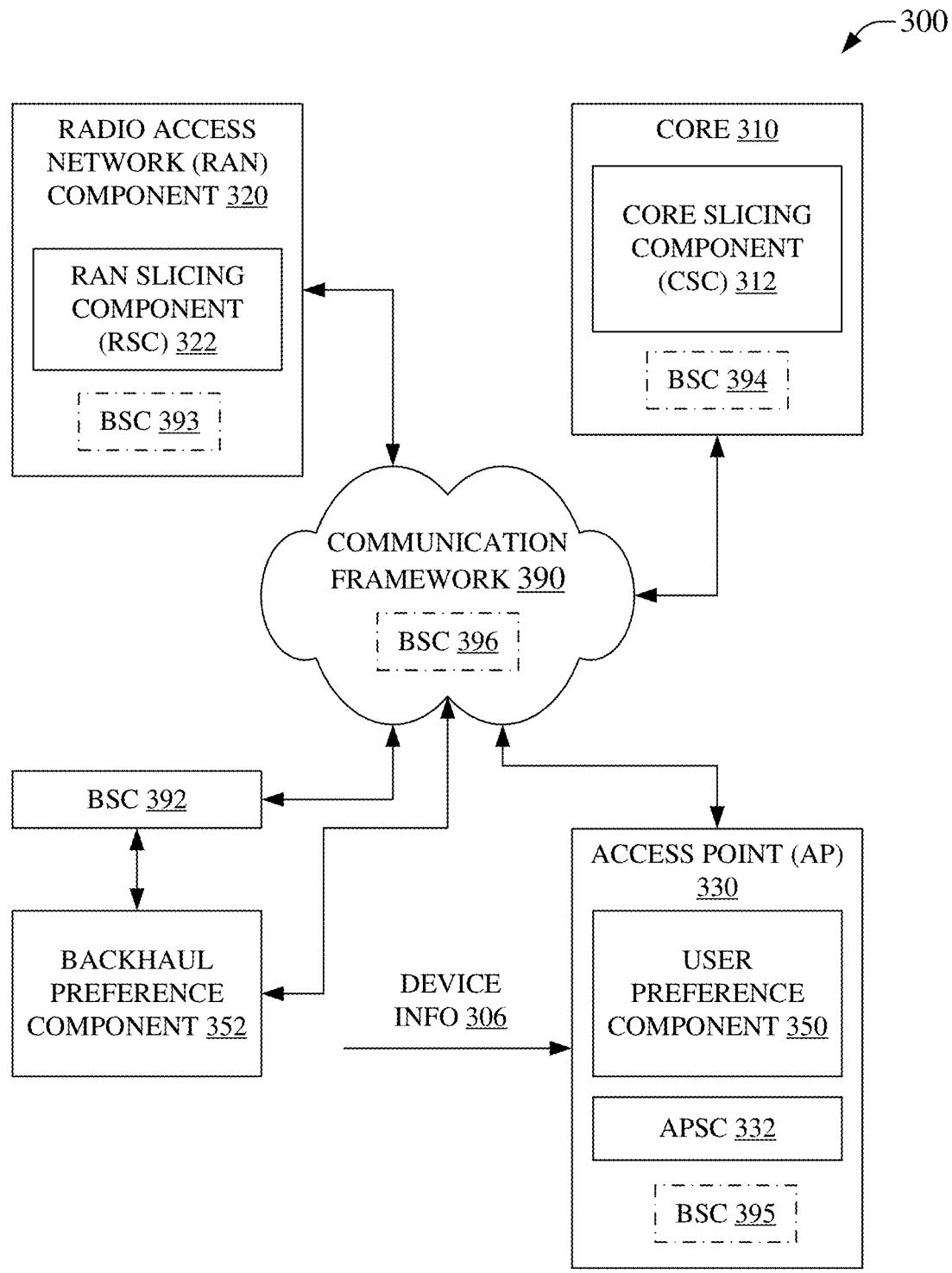
FIG. 3 is an illustration of an example system that can enable adaptive grouping of an access point slice, a backhaul slice, a RAN slice and/or network core slice based on a user preference and device information, in accordance with aspects of the subject disclosure.

FIG. 3 is an illustration of a system 300, which can facilitate adaptive grouping of an access point slice with a RAN slice, BH slice, and/or network core slice based on a user preference and device information, in accordance with aspects of the subject disclosure. System 300 can comprise core 310 that can enable grouping of an AP slice with RAN, BH, and/or core slices. Core 310 can comprise CSC 312. CSC 312 can support slicing of core computing resources to make one or more of a group of VNFs available via a portion of network resources that can be different than other possible core slices. Similarly, communication framework 390 can be sliced via one or more of BSCs 392-396, etc. This can allow access to VNFs in a more efficient manner, via a designated BH slice(s), than without core slicing. CSC 312 can provide a core slice that can be provisioned via core 310 in a manner that can be combined with an AP slice, a BH slice, a RAN slice, etc.

System 300 can further comprise radio access network (RAN) component 320 that can enable grouping of an AP slice with RAN, BH, and/or core slices. RAN component 320 can comprise RAN slicing component (RSC) 322. RSC 322 can support slicing of RAN computing resources to make one or more of a group of VNFs available via a portion of network resources that can be different than other possible RAN slices. This can allow access to those VNFs in a more efficient manner than without RAN slicing, similar to core slicing. RSC 322 can provide a slice that can be provisioned via RAN component 320 in a manner that can be combined with an AP slice. Moreover, RAN component 320 can determine a RAN slice in a manner that can be coordinated with core slicing, e.g., core slicing information can be utilized in determining a RAN slice, RAN slicing information can be used to determine a core slice, etc. In this regard, RAN and core slices can be coordinated. These can additionally be coordinated with a BH slice(s). Moreover, coordination of RAN, BH, and/or core slices can be similarly coordinated with an AP slice, e.g., a RAN/core slice can be utilized in determining an AP slice and/or BH slice, an AP slice can be utilized in determining a BH and/or RAN/core slice, etc. An end result can be that an AP slice, a RAN slice, a BH slice, and/or a core slice can be determined in a coordinated manner. In embodiments, this can enable efficient migration of a UE between RAN 320 and AP 330. As an example, an IOT-type slice for AP 330 can facilitate communicating information to other components of system 300 to facilitate determining, and grouping of an IOT-type RAN slice, IOT-type BH slice, or combinations thereof, to, an IOT-type core slice. Said information can be communicated, for example, via communication framework 390, to RAN component 320 to facilitate determining an IOT-type RAN slice, such that, when an IOT migrates from AP 330 to RAN component 320, a similar slice can be available at RAN component 320 that is inherently well matched to the existing IOT-type core slice already in use.

An AP slice can be determined by APSC 332 that can be comprised in AP component 330. An AP slice can, as previously noted, virtualize AP component functions and resources specific to identified criteria in a manner similar to slicing of core computing resources. APSC 332 can slice AP computing resources based on device info 306. In some embodiments, APSC 332 can receive RAN slicing, BH slicing, and/or core slicing information, e.g., via communication framework 390, etc., and can determine an AP slice further based on the received BH slice, RAN slice, and/or core slice information. In some embodiments, APSC 332 can communicate AP slice information to RSC 322, BSC 392, etc., and/or CSC 312, e.g., via communication framework 390, etc., to facilitate RSC 322, BSC 392, etc., and/or CSC 312 determining corresponding RAN, BH, and/or core slices based on AP slices. As such, an AP slice, a RAN slice, a BH slice, and/or a core slice can be coordinated to facilitate efficient interoperation.

An AP slice can be coordinated with a RAN/core slice to provide similar levels of allocated computing resources and functionality, for example, where a core slice and BH slice remain the same or similar. In embodiments, APSC 332 can be comprised in AP 330. However, in some embodiments, APSC 332 can be external to AP 330, or even comprised in core computing resources, e.g., at core 310, etc. Moreover, in some embodiments, APSC 332 can be comprised in a RAN-side component, e.g., RAN component 320, etc. In some embodiments, RSC 322 APSC 332 and CSC 312 can be comprised in a core-side component, e.g., core 310, etc., although this highly centralized slicing, in some embodiments, can be less efficient that distributing slicing components among RAN and/or AP components that can access distributed processors, memory, network connections, etc. In some embodiments, BSC 392 can be comprised in a core-side component, e.g., core 310, in a RAN-side component, e.g., RAN 320, in an AP-side component, e.g., AP 330, in a communications framework 390 component, etc., e.g., as one or more of SBCs 392-396, etc.

In embodiments, AP 330 can comprise user preference component 350 to facilitate implementing AP slicing based on user preference information. User preference information can augment or supplant other information relevant to AP slicing, e.g., device info 306. As an example, user preference information can indicate that an identified device, such as a security camera be allocated an AP slice that has moderate latency in lieu of a lower latency AP slice that might be selected based on device info 306 where, for example, a user is employing the security camera to monitor the growth of a plant instead of monitoring a doorway, etc., e.g., the need for the example security camera to promptly communicate video content can be lower than would typically be expected of a security camera where it is merely being used to see when a plant might be blooming instead of monitoring for an intrusion into a home. In another example, a user can indicate a preference to employ an AP slice with grater bandwidth for a child's device during homework hours, which can be used in conjunction with device info 306 for the child's device connecting to AP 330 to increase the bandwidth of an allocated AP slice than at other times of day.

Similarly, in embodiments, one or more of BSC 392-396 can be communicatively coupled to backhaul preference component 352. BH preference component 352 can facilitate implementing BH slicing based on preference information corresponding to the communication framework, for example, and internet service provider (ISP) can set preferences on backhaul network usage, etc. In an aspect, this can avoid a user preference from being having a level of control over the user's portion of a backhaul network that, for example, exceeds a contractual level of control. Similarly, the backhaul preference component 352 can employ user designated values in relation to the backhaul network to aid in slicing, for example, user credit information and a maximum cost selected by the user can be employed by component 352 to purchase additional BH slice performance, such as renting unused bandwidth from a neighbor, that does not exceed the maximum cost value and can be automatically billed to the customer base do the credit information. Accordingly, where the user only occasionally employs higher performing BH slices, this can be performed in an automated manner based on preset information via backhaul preference component 352. Similarly, a user can make underutilized BH resources available according to criteria that can be accessed via backhaul preference component 352, and can be employed in slicing communication framework 390 via BSC 392, etc.

Figure 4:
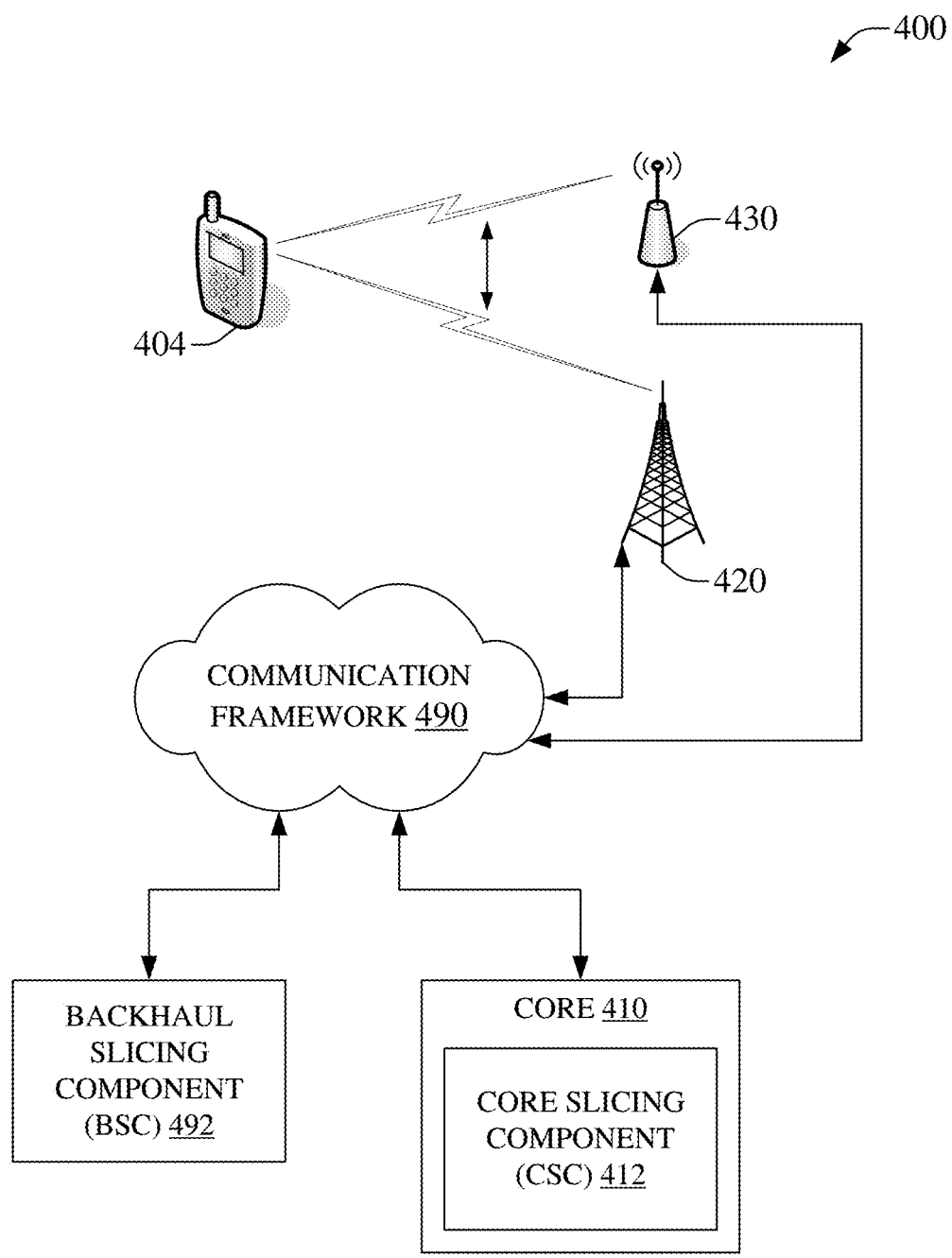
FIG. 4 illustrates an example system that can facilitate adaptive grouping of an access point slice, a backhaul slice, a RAN slice and/or network core slice to facilitate migration of an end point device between an access point device and a RAN device, in accordance with aspects of the subject disclosure.

FIG. 4 is an illustration of a system 400, which can enable adaptive grouping of an access point slice with a RAN slice, BH slice, and/or network core slice to facilitate migration of an end point device between an access point device and a RAN device, in accordance with aspects of the subject disclosure. System 400 can comprise core 410 that can comprise CSC 412 to determine core slices. System 400 can comprise BSC 492 that can slice communication framework 490 into BH slices. Core 410 and BSC 492 can each coordinate slicing with slicing determinations at RAN 420 and AP 430, as disclosed elsewhere herein, e.g., via communication framework 490, etc.

In embodiments, UE 404 can migrate between RAN 420 and AP 430. As an example, UE 404 can be a user phone attached to RAN 420, e.g., a RAN, BH, core slice, or combination thereof, can be supporting the phone as the user approaches their office on a morning drive into work. In this example, the user's workplace can comprise AP 430. Device info, e.g., device info 206, 306, etc., can comprise location data for the example user phone, such that when the phone is determined to be approaching the workplace, AP 430 can be signaled to determine an appropriate AP slice that, for example, can be premised on a RAN, BH, core slice, of combinations thereof, associated with the phone on the example drive into work. AP 430, in response to device info, signaling, etc., can determine a coordinated AP slice, such that when the phone is in range of AP 430, the phone can be handed over from RAN 420 to AP 430 according to the coordinated AP slice. In this example, the determined AP slice can provide similar parameters as the RAN slice and can further be coordinated with the existing BH slice, core slice, etc. Similarly, where UE 404 migrates from AP 430 to RAN 420, coordinated slicing can be accomplished to again provide efficient transition between an AP slice and a RAN slice that can offer similar performance to the AP slice, and can generally be coordinated with a BH slice, core slice, etc., that can be part of a previously coordinated AP-BH-core slice group, e.g., a RAN-BH-core slice group can be selected that can be coordinated with an AP-BH-core slice group to enable efficient migration of UE 404 from AP 430 to RAN 420.

Figure 5:
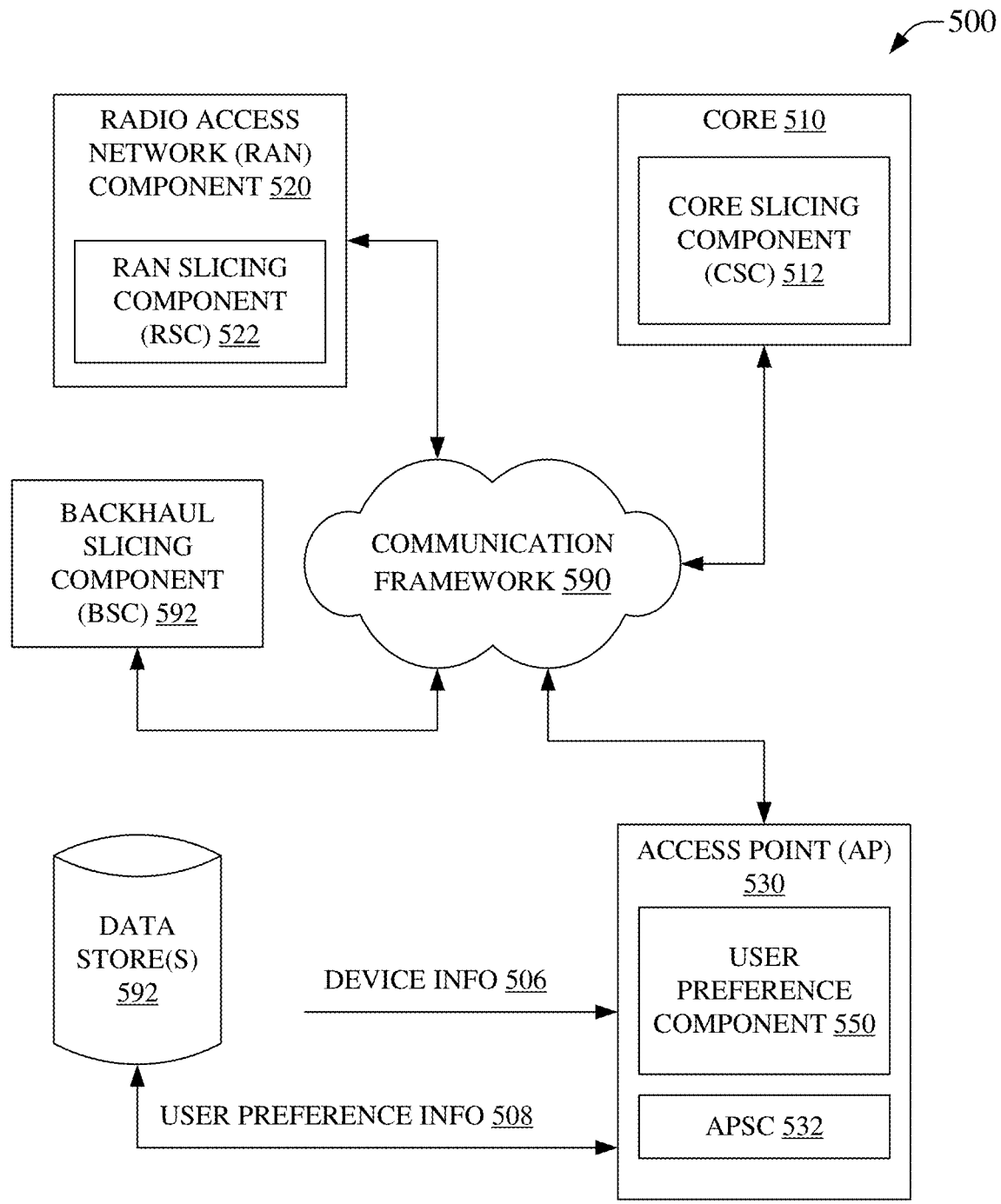
FIG. 5 illustrates an example system that can facilitate adaptive grouping of an access point slice, a backhaul slice, a RAN slice and/or network core slice based on device information and user preference information retrieved from a data store, in accordance with aspects of the subject disclosure.

FIG. 5 is an illustration of a system 500, which can support adaptive grouping of an access point slice with a RAN slice, BH slice, core slice, or combination thereof, based on device information and user preference information retrieved from a data store, in accordance with aspects of the subject disclosure. System 500 can comprise core 510 that can enable grouping of an AP slice with RAN, BH, core slice(s), or combinations thereof. BSC 592 can support slicing of communication framework 590 resources based, for example, on use of, or expected use of, communication framework resources. Core 510 can comprise CSC 512. CSC 512 can support slicing of core computing resources to make one or more of a group of VNFs available via a portion of network resources that can be different than other possible core slices. This can allow access to those VNFs in a more efficient manner than without core slicing. CSC 512 can provide a slice that can be provisioned via core 510 in a manner that can be combined with an AP slice, a BH slice, a RAN slice, or combinations thereof.

System 500 can further comprise radio access network RAN component 520 that can enable grouping of an AP slice with RAN, BH core slices, or combinations thereof. RAN component 520 can comprise RSC 522. RSC 522 can support slicing of RAN computing resources to make one or more of a group of VNFs available via a portion of network resources that can be different than other possible RAN slices. RSC 522 can provide a RAN slice that can be provisioned via RAN component 520 in a manner that can be combined with an AP slice. Moreover, RAN component 520 can determine a RAN slice in a manner that can be coordinated with core slicing, e.g., core slicing information can be utilized in determining a RAN slice, RAN slicing information can be used to determine a core slice, etc. Similarly, RAN component 520 can determine a RAN slice that can be complimentary to a BH slice. In some embodiments, the BH slice can be determined based on one or more of an AP slice, a RAN slice, a core slice, etc. In other embodiments, the RAN slice can be determined based on one or more of an AP slice, a core slice, a RAN slice, etc. To this end, the AP, BH, RAN, and core slices of a network slice group can be coordinated. Any one or more of the AP, BH, RAN, and/or core slices of a network slice group can be employed in deterring and/or selecting any one or more of the other AP, BH, RAN and/or core slices of the network slice group, for example, as illustrated elsewhere herein. As a general end result, an AP slice, a RAN slice, a BH slice, and/or a core slice can be determined in a coordinated manner. In embodiments, this can enable efficient migration of a UE between RAN 520 and AP 530.

An AP slice can be determined by APSC 532 that can be comprised in AP component 530. An AP slice can virtualize AP component functions and resources specific to identified criteria in a manner similar to slicing of core computing resources. APSC 532 can slice AP computing resources based on device info 506. In some embodiments, APSC 532 can receive RAN slicing, BH slicing, and/or core slicing information, e.g., via communication framework 590, etc., and can determine an AP slice further based on the received RAN, BH, and/or core slice information. In some embodiments, APSC 532 can communicate AP slice information to RSC 522, BSC 592, and/or CSC 512, e.g., via communication framework 590, etc., to facilitate RSC 522, BSC 592, and/or CSC 512 determining corresponding RAN, BH, core slices based on AP slices. As such, an AP slice, a RAN slice, a BH slick, and/or a core slice can be coordinated to facilitate efficient interoperation.

In embodiments, AP 530 can comprise user preference component 550 to facilitate implementing AP slicing based on user preference information. User preference information can augment or supplant other information relevant to AP slicing, e.g., device info 506. In embodiments, user preference info 508 can be received by AP 530 and employed in determining an AP slice. User preference info 508 can be employed to augment or supplant AP slicing determinations based on device info 506, as previously noted elsewhere herein. In an embodiment, user preference info 508 can be stored via remotely located data store(s) 592. Data store(s) 592, for example, can be embodied in a user profile that can reside on nearly any component of system 500, e.g., on core 520 or another core component, at RAN component 520, at AP 530, in a remote profile server, etc. In some unillustrated embodiments, device info 506 can similarly be stored remote from AP 530, for example, device info 506 can be stored on a personal service of a user that can be attached to AP 530 or some other AP component, can be stored on a core network component servicer, etc. In embodiments, data store(s) 592 can therefore facilitate generation of more consistent AP slices at different AP components, for example, user preference info 508 can be stored at a remote server and can be communicated to a first AP component at a user's home and a second AP component at a user's office such that the home and office AP components can determine corresponding AP slices that can both be premised on the user's preference data from the data store.

Moreover, in embodiments, AP slices can be adapted, updated, replaced, added, removed, etc., in more synchronized manner via storing of user preference info 508, device info 506, etc. In an example, a user can update network interface card of a laptop computer while at the user's office, which can result in updating of an office AP slice based on the updated network interface card. In this example, the updated AP slice information can be employed to trigger updating of device info 506 and/or user preference info 508 at data store(s) 592, such that when the user returns home with the upgraded laptop computer, the user's home AP device can implement a home AP slice reflective of the upgraded network interface card, e.g., identifying the user's laptop is connecting via the home AP device can retrieve updated device info 506 and user preference info 508 from data store(s) 592 to provide an appropriate AP slice at home. Similarly, changes to user preference info 508 at the example user's home can be automatically propagated to the office AP device via data stored(s) 592. In this regard, the centralization of device libraries, reference libraries, etc., can further propagate to RAN slices, BH slices, and/or core slices where RAN, BH, and/or core slices can be coordinated with AP slices. As an example, the upgraded network interface card of the previous example laptop can result in adapting an AP slice, which adaptation can result in adapting a BH slice and a core slice. These adapted BH and core slices can then cause determining of a different RAN slice than may have previously been employed, e.g., when the user came into work before the network interface card upgrade a first RAN slice can be grouped with a first BH slice and a first core slice that can be coordinated with a first AP slice when the user arrives at the office, then, after the upgrade to the laptop, the first AP slice can be adapted to a second AP slice, which can result in adapting the first BH and first core slice to a second BH and second core slice, such that when the user leaves the office, a second RAN slice can be determined based on the second AP slice, second BH slice, and second core slice. In this example, the second RAN slice can then facilitate handover to a third AP slice at the user's home, wherein the third AP slice can be based on the second RAN slice, second BH slice, and the second core slice. In some embodiments, device info 506 can be updated, such as via data store(s) 592, to enable updating the example third AP slice based on the updated device info, or even on the second AP slice from the office. This end-to-end coordination can be particularly valuable where AP, RAN, BH, and/or core slicing is updated often, e.g., where groupings of AP, RAN, BH, and core slices are regularly updated, propagating these changes to subsequent slices to facilitate coordination can result in better synchronization of slices.

Figure 6:
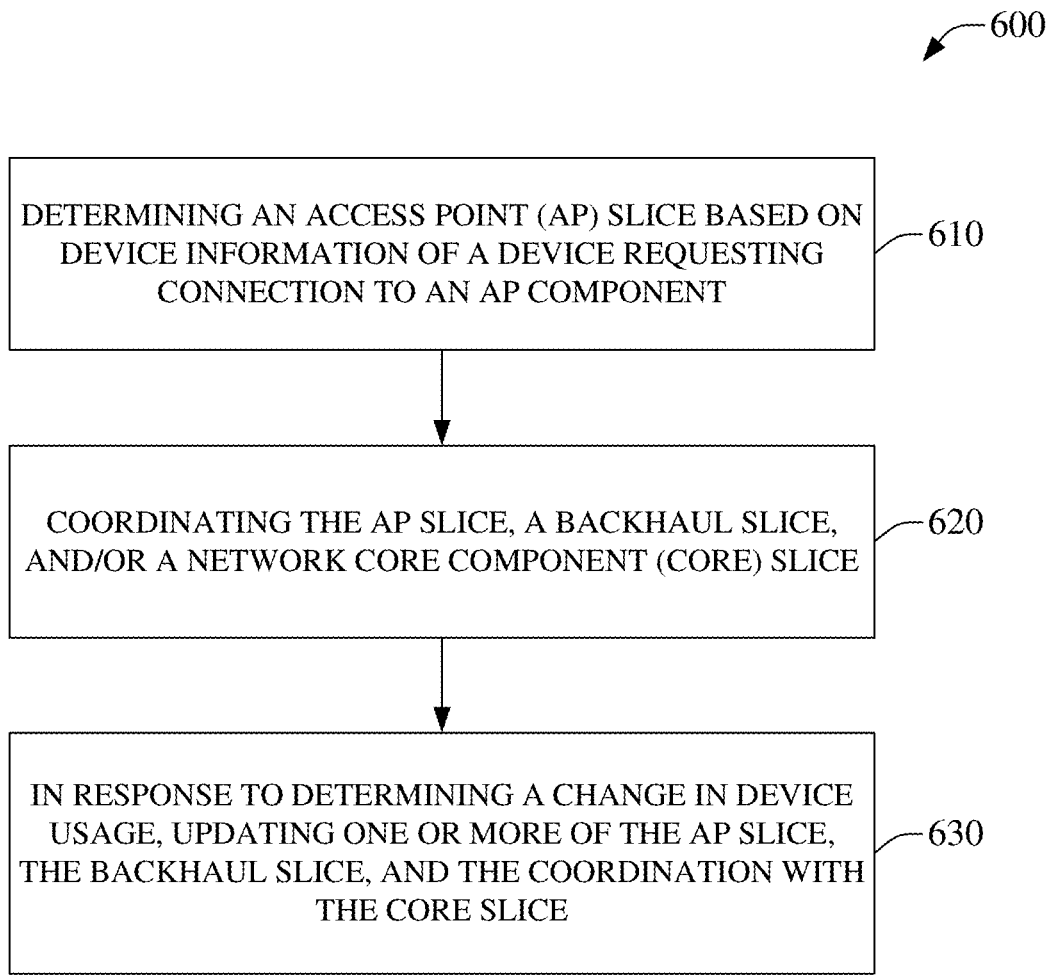
FIG. 6 is an illustration of an example method, enabling adaptive grouping of an access point slice, a backhaul slice, a RAN slice and/or network core slice, in accordance with aspects of the subject disclosure.
Figure 7:
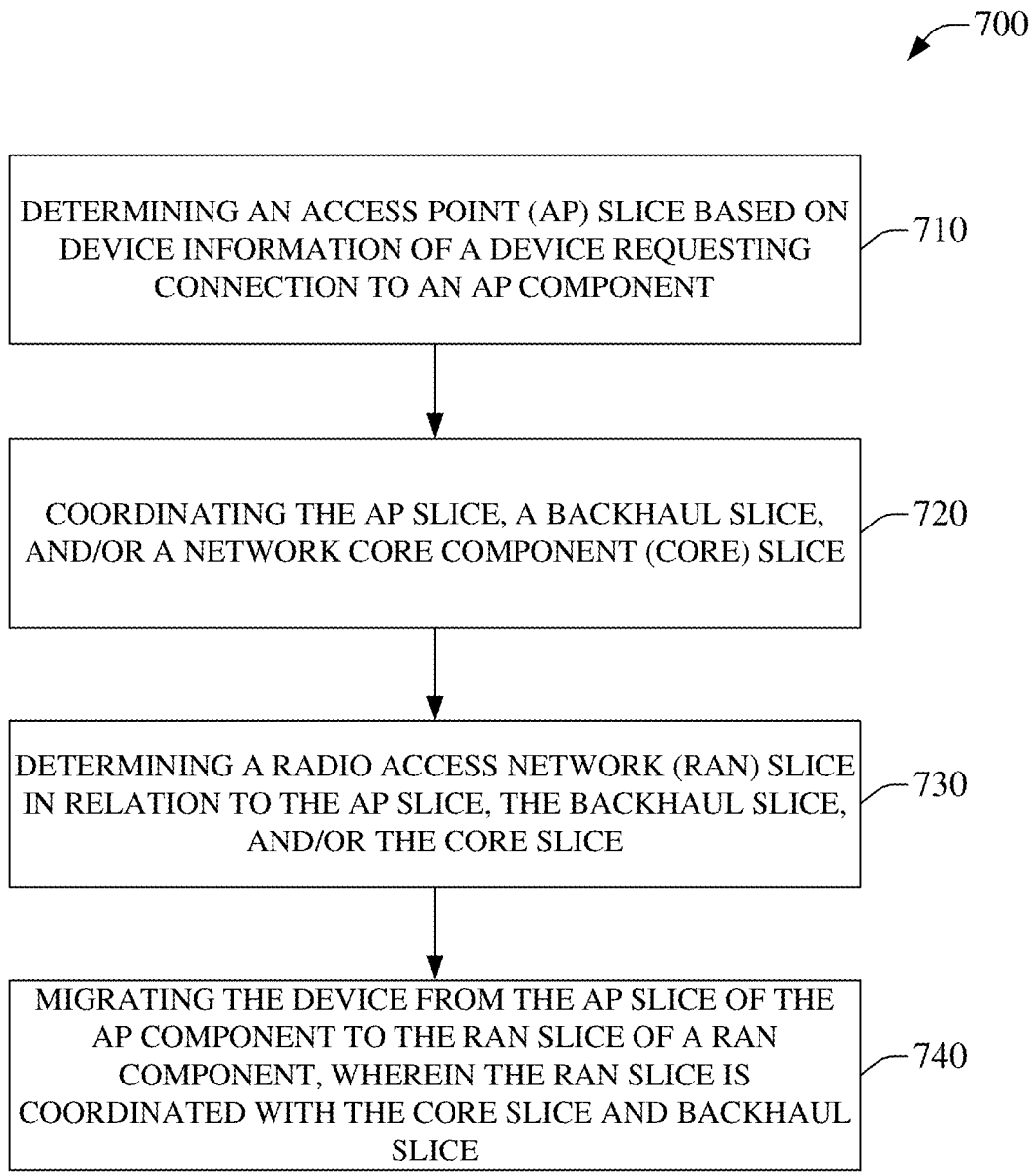
FIG. 7 illustrates an example method, facilitating adaptive grouping of an access point slice, a backhaul slice, a RAN slice and/or network core slice to support device handover, in accordance with aspects of the subject disclosure.
Figure 8:
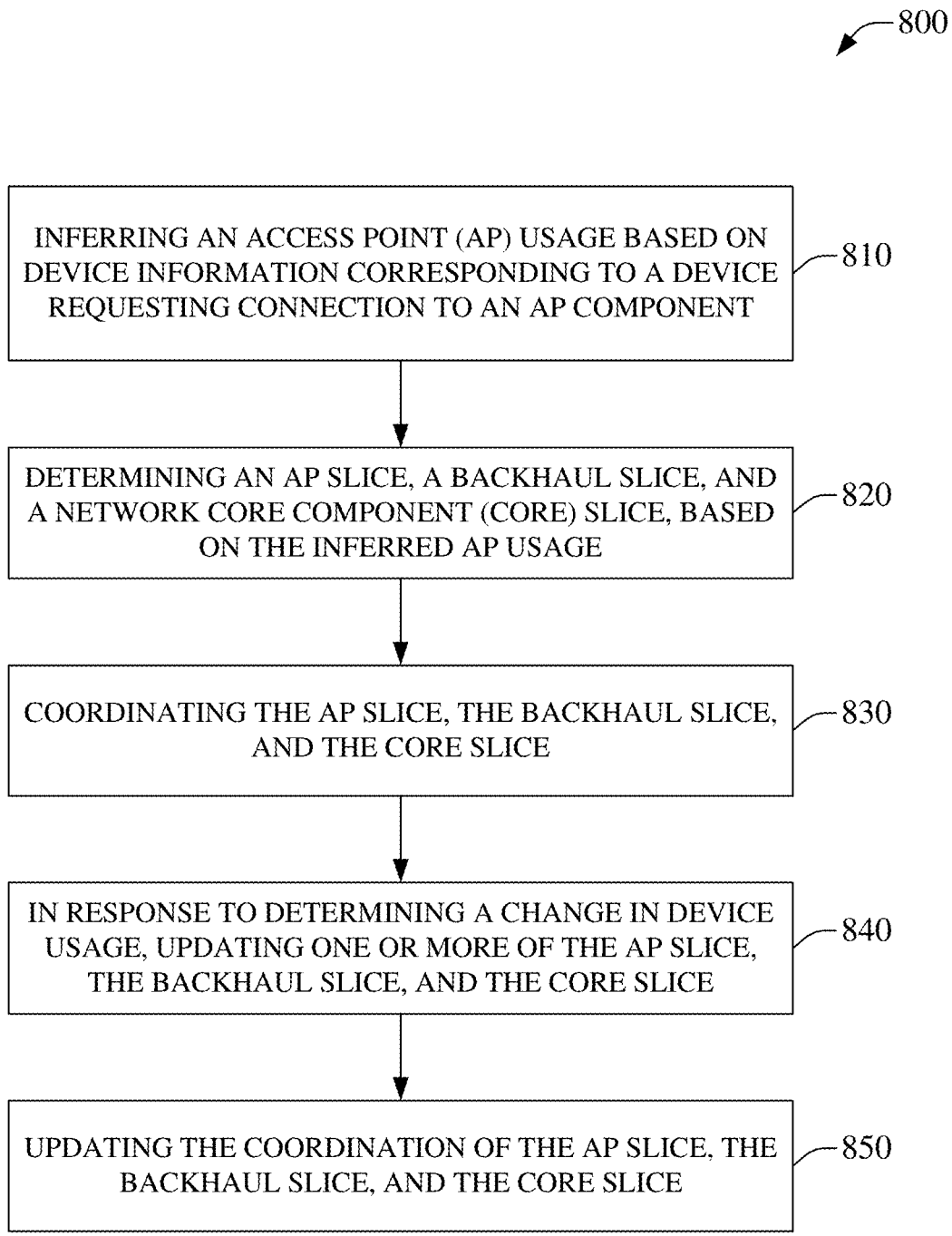
FIG. 8 illustrates an example method, enabling inferred adaptive grouping of an access point slice, a backhaul slice, a RAN slice and/or network core slice, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate adaptive grouping of an access point slice with a RAN slice, BH slice, core slice, or combinations thereof, in accordance with aspects of the subject disclosure. At 610, method 600 can comprise determining an access point (AP) slice based on device information of a device requesting connection to an AP component. AP slicing can provide adaptable AP resource segmentation and granular service differentiation between devices connecting to an AP, e.g., user equipment and/or non-user equipment, collectively generally referred to as UEs herein. A UE can request performance parameters of a connection to an AP device. These performance parameters, e.g., bandwidth, QoS, throughput, latency, services, virtual network functions (VNFs), etc., can be reflected in a slice of AP device computing resources, e.g., one or more AP slices. The slices can be determined therefore be based on device information, e.g., device type, device model, device ownership, device performance metrics (key performance indicators (KPIs), etc.), user preferences corresponding to the device and/or device environment, services to be implemented via the device, or any of many other pieces of device related information. As an example, a first AP slice can be different than a second AP slice based on what UE is requesting connection to the AP, when the device is connecting, what preferences are specified for the connection, current AP device available resources, available VNFs and/or services, contracted service tiers, privacy designators, security features to be implemented, etc., e.g., an AP slice can be tightly determined to provide preferred levels of service to a connecting device. In some embodiments, the AP slice can be further based on information about available RAN, backhaul, and/or core network slices, e.g., to foster coordination between one AP and RAN slices, BH slices, core slices, or combinations thereof, as has been disclosed elsewhere herein.

At 620, method 600 can comprise coordinating the AP slice, a BH slice(s), and/or a network core component (core) slice. Information about the AP slice can be communicated to a network core component to facilitate coordination of an AP slice(s), a BH slice(s), a core slice(s), a RAN slice(s), or combinations thereof, as has been disclosed herein. It is noted that an AP slice that is not coordinated with a BH slice, a core slice, or combinations thereof, can be more complicated to manage than an AP slice that is coordinated with a BH slice, a core slice, or combinations thereof, e.g., a BH slice, a core slice, and an AP slice that each meet the same requested performance parameters can be more streamlined than moving data between an AP slice meeting designated parameters and one or more BH and/or core slices that do not meet the designated parameters. As an example, an AP slice can be selected to provide very low latency, for example to service an augmented reality experience that suffers if there is data lag due to latency. Grouping the example AP slice with a coordinated core slice can therefore maintain the low latency performance requested for the augmented reality application. However, if, the example AP slice is groups with the example core slice via a BH slice that has high latency, then the benefit of slicing the AP and core can be frustrated by the high latency of the backhaul network slice selected. This lack of coordination can be avoided according to the present disclosure. As such, the performance of the example augmented reality application can be better supported where the AP slice is coordinated with both the example core slice and a satisfactory BH slice(s). In embodiments, information corresponding to an AP slice can be communicated to a communication framework and to a network core component that can each attempt to provide access to, or determine, a coordinated slice, e.g., the communication framework can be sliced into a BH slice(s) and the core can be sliced into a core slice(s) that are complimentary to the example AP slice. In some embodiments, BH and or core slice information can be propagated to the AP device to facilitate coordinated determination of an AP at 610, e.g., the determination of the AP slice can be based on predetermined BH slice and/or predetermined core slice information. In some embodiments, information about potential BH and/or core slicing can be communicated to the AP device, the AP device can determine the AP slice at 610 in the context of the potential BH/core slicing based on the coordination at 620 already being possible from the indicated potential BH/core slices, e.g., the AP device can be aware of the extents of BH and/or core slicing so that a selected AP slice is within the extents and a coordinated BH or coordinated core slice and can be readily deployed. This can avoid conditions where the AP slice has performance parameters that are not supported by any possible BH or core slice(s), for example, a core slice may have a predefined group of VNFs that can be limiting to some AP slices, a backhaul network can have known performance limitations, etc.

Method 600, at 630, can comprise, in response to determining a change in device usage, updating the AP slice and the coordination with a BH slice and/or a core slice. At this point, method 600 can end. At 630, method 600 can describe adapting an AP slice and the corresponding BH and/or core slice(s). Where there is a change in the demand on the AP computing resources, e.g., processors, memory, network, etc., for example due to a change in use or function of a UE, the AP slice can be adapted. In this regard, adapting the AP slice, and also the BH and/or core slice(s), can comprise updating the slice parameters, VNFs, services, etc., adding a slice, deleting a slice, merging slices, dividing a slice(s), determining a new slice, etc. As an example, a UE streaming music can be allocated an AP slice, coordinated with a BH slice, a core slice, or combinations thereof, that provide moderate latency, minimal throughput, and a data caching VNF to buffer against network interference/interruptions. Where the example UE opens a real-time video conferencing application, the AP, for example, can add an additional AP slice to support the video conference with a low-latency and high bandwidth slice that can be paired with an adaptation to the latency and bandwidth parameters of BH slice(s) and/or core slice(s), e.g., the AP slice can be modified by adding an additional AP slice while the BH and core slices can have slice parameters directly modified and both AP slices can be grouped to updated BH and core slice(s).

FIG. 7 illustrates example method 700 that facilitates adaptive grouping of an access point slice with a RAN slice, BH slice, core slice, or combinations thereof, to support device handover, in accordance with aspects of the subject disclosure. Method 700, at 710, can comprise determining an access point (AP) slice based on device information of a device requesting connection to an AP component. AP slicing can provide adaptable AP resource segmentation and granular service differentiation between devices connecting to an AP. Performance parameters of a connection to an AP device can be reflected in a determined slice of AP device computing resources, e.g., one or more AP slices.

At 720, method 700 can comprise coordinating the AP slice with a BH slice, core slice, or combinations thereof, which can comprise communicating information about the AP slice to a network core component to facilitate coordination of an AP slice, a BH slice, a core slice, a RAN slice, or combinations thereof. An AP slice can therefore be employed to select a BH slice, core slice, or combinations thereof, that can meet the same requested performance parameters to streamline moving data via the AP slice, the BH slice, the core slice, or combinations thereof. In embodiments, information corresponding to the AP slice can be communicated to a network core component that can attempt to provide access to, or determine, a coordinated core slice. Similarly, information corresponding to the AP slice can be communicated to a communication framework component that can provide access to, or determine, a coordinated BH slice. In some embodiments, BH slice and/or core slice information can be propagated to the AP device to facilitate coordinated determination of an AP at 710, e.g., the determination of the AP slice can be based on predetermined BH and/or core slice information. In some embodiments, information about potential BH and/or core slicing can be communicated to the AP device, the AP device can determine the AP slice at 710 in the context of the potential BH and/or core slicing to enable the coordination at 720 to already be possible, e.g., the AP device can be aware of the extents of BH and/or core slicing, so that the AP slice is selected to already be within the extents and a coordinated network slice can be readily deployed. This can avoid conditions where the AP slice has performance parameters that are not supported by any possible BH and/or core slice(s), for example, a core slice may have a predefined group of VNFs that can be limiting to some AP slices, etc.

Method 700, at 730, can comprise determining a radio access network (RAN) slice in relation to the AP slice, the BH slice, the core slice, or combinations thereof. It is noted that a UE can migrate, undergo a handover between, etc., an AP component and a RAN component. Accordingly, method 700 can facilitate determining a RAN slice that can be coordinated with the AP slice of 710 and the coordinated BH/core slice of 720. In this regard, migrating a UE from an AP to a RAN can be simplified and efficient. As an example, an AP-BH-core slice group can support a first VNF. In this example, at 730, a RAN slice can be determined that also supports the first VNF. Accordingly, where a UE employing the AP-BH-core slice group migrates away from an AP and into a RAN coverage area, the RAN slice with the first VNF can be employed. Where the example RAN slice supports the first VNF and BH and the core slice of the AP-BH-core slice group also supports the first VNF, grouping the RAN slice with the BH and core slices can also seamlessly support the first VNF, e.g., via a RAN-BH-core slice group, that can be in use by the migrating UE. As such, the example UE can be handed over from the AP to the RAN, e.g., from the example AP-BH-core slice group to the example RAN-BH-core slice group. In some embodiments, the UE can migrate from a RAN to an AP in a similar manner as is disclosed elsewhere herein. In these embodiments, RAN slice information can be employed in determining an AP slice that can then be inherently better coordinated with BH and core slices already associated with the RAN slice, which can facilitate migrating a UE from the RAN to the AP device. This concept will be readily appreciated by those in the relevant arts and is considered fully within the scope of the instant disclosure, even where not discussed in further detail herein for the sake of clarity and brevity.

Method 700, at 740, can comprise migrating the device from the AP slice of the AP component to the RAN slice of a RAN component, wherein the RAN slice is coordinated with a BH slice(s), a core slice(s), or combinations thereof. At this point, method 700 can end. The determination of a RAN slice that is coordinated with the AP slice, generally already comprised in an AP-BH-core slice group, can support streamlined migration of devices between an AP device and a RAN device. As such, a wireless device, such as a phone, cellular enabled tablet, laptop computer, etc., can switch from an AP component, e.g., a wireless local area network (LAN), etc., to a RAN component, e.g., a wireless wide area network (WAN), etc. This can be appreciated in an example moving a smartphone from a home wireless LAN network to a 5G cellular network. In this regard, it can be less complex to already have synchronized the performance of AP and RAN slices.

FIG. 8 illustrates example method 800 enabling inferred adaptive grouping of an access point slice with a RAN slice, BH slice, core slice, or combinations thereof, in accordance with aspects of the subject disclosure. Method 800, at 810, can comprise inferring an access point (AP) usage based on device information corresponding to a device requesting connection to an AP component. In some embodiments, an inference can be formed by a machine learning component, an artificial intelligence component, etc., which inference can be employed in determining, designating, sorting, ordering, ranking, etc., an AP, RAN, BH, CN, or combination slice. The machine learning component, the artificial intelligence component, etc., can be generally referred to as an inference component. The inference component can generate an expected result based on models, patterns, historical data, etc. As such, an inference can be made based on device information as to AP usage. This AP usage can then be expected to define performance parameters for one or more AP slices.

Method 800, at 820, can comprise determining an AP slice based on the inferred AP usage. AP slicing can provide adaptable AP resource segmentation and granular service differentiation between devices connecting to an AP. The inferred AP usage from 810 can comprise inferred performance parameters for a connection to an AP device. As an example, a user can regularly wake at 6 am for work and can spend some time reviewing email early in the morning. Accordingly, in this example, it can be inferred that this behavior will occur tomorrow morning, such that an AP slice can be determined and ready for use the following morning, e.g., the inferred performance parameters can be reflected in a precomputed AP slice.

At 830, method 800 can comprise coordinating the AP slice with a BH slice(s), a core slice(s), or combinations thereof. Information about the AP slice can be communicated to a network core component to facilitate coordination of an AP slice, one or more BH slice, one or more core slice, one or more RAN slice, or combinations thereof, as has been disclosed herein. It is noted that where the AP slice is precomputed based on the inferences of 810, the coordination with a BH and/or core slice can also occur before the AP slice is actual employed, e.g., the coordination can be precoordinated based on the inference and the corresponding predetermined AP slice. As previously disclosed herein, for some embodiments, information corresponding to the AP slice can be communicated to a communications framework and a network core component that can attempt to provide access to, or determine, a coordinated BH slice, core slice, or combination thereof. In some embodiments, BH and/or core slice information can be propagated to the AP device to facilitate coordinated determination of an AP at 820, e.g., the determination of the AP slice can be based on predetermined BH slice and/or core slice information along with the inferred AP usage. In some embodiments, information about potential BH/core slicing can be communicated to the AP device, the AP device can determine the AP slice at 820 in the context of the inferred AP usage and the potential BH/core slicing to enable the coordination at 830 to already be possible, e.g., the AP device can be aware of the extents of BH/core slicing so that a predetermined AP slice is within the extents and a coordinated BH/core slice can be readily deployed. This can avoid conditions where the predetermined AP slice has performance parameters that are not supported by any possible BH/core slice(s), e.g., the predetermined AP slice is outside the extents of possible BH/core slices.

At 840, method 800, in response to determining a change in device usage, can comprise updating the predetermined AP slice and the coordination with the BH slice, core slice, or combinations thereof. At this point, method 800 can end. Adapting an AP slice and the corresponding BH slice and/or core slice can comprise responsively adapting the AP slice and coordinated BH/core slice(s). However, in some embodiments, the adapting can be based on further inference from an inference component, e.g., an inference can be made that the demands on the AP device will change, and an updated AP slice can again be predetermined and precoordinated with BH slice(s), core slice(s), RAN slice(s), or combinations thereof, which can facilitate updating the AP slice at 840. In general, where the demands on the AP computing resources change, or upcoming change is inferred to be likely, the AP slice can be adapted. In this regard, adapting the AP slice, and also the BH/core/RAN slice, can comprise updating the slice parameters, VNFs, services, etc., adding a slice, deleting a slice, merging slices, dividing a slice(s), determining a new slice, etc.

Figure 9:
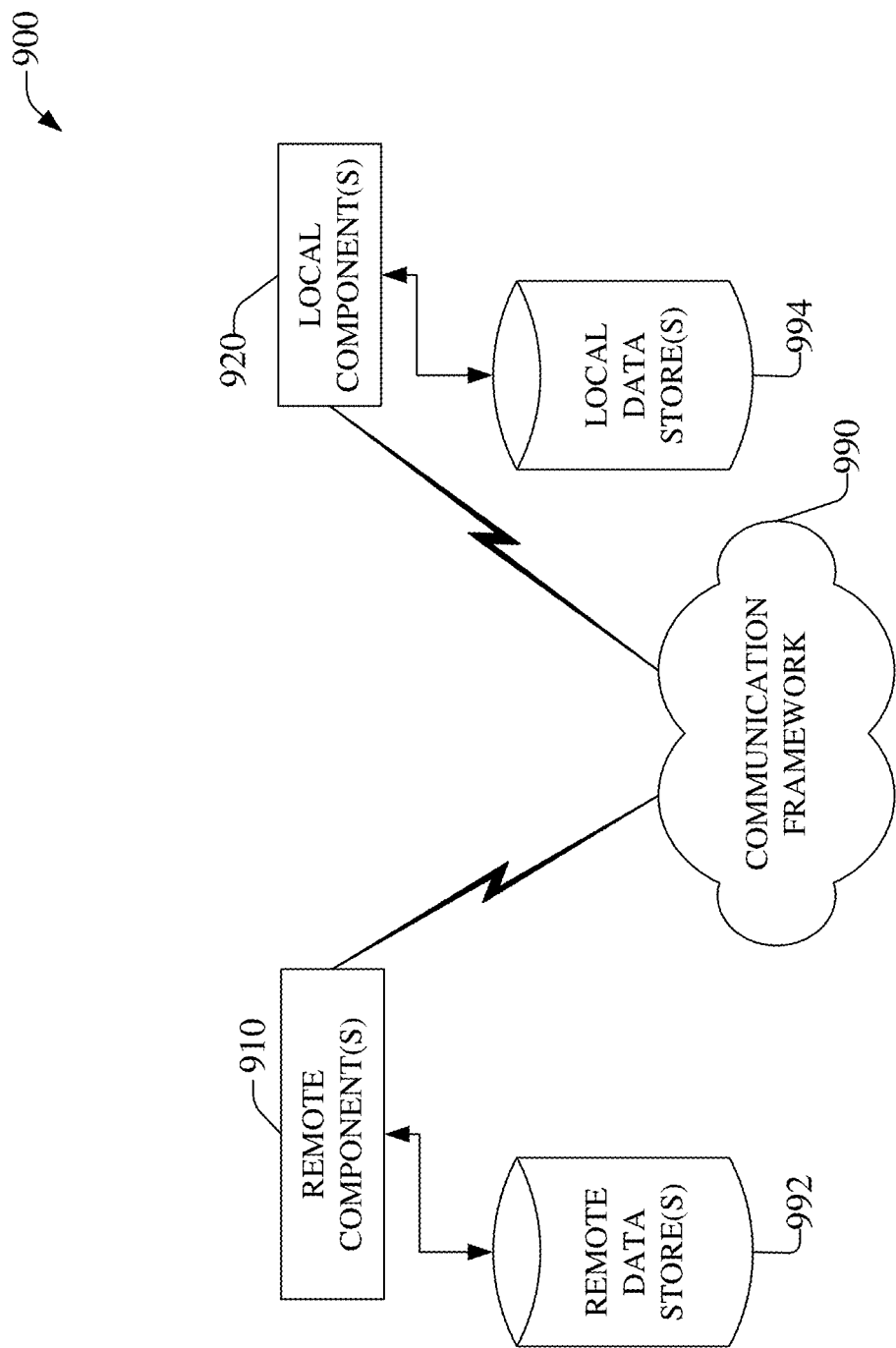
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise network core components 110-510, etc., RAN component 120, 320-520, etc., BSC 292, 392-396, 492, 592, etc., AP component 120-520, etc., data store(s) 592, 992, 994, etc., UE 102, 104, etc., or any other component that is located remotely from another component of systems 100-500, etc.

The system 900 also comprises one or more local component(s) 920. The local component(s) 920 can be hardware and/or software (e.g., threads, processes, computing devices). In some embodiments, local component(s) 920 can comprise network core components 110-510, etc., RAN component 120, 320-520, etc., BSC 292, 392-396, 492, 592, etc., AP component 120-520, etc., data store(s) 592, 992, 994, etc., UE 102, 104, etc., or any other component that is located local with another component of systems 100-500, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 992, such as a hard drive, solid state drive, SIM card, device memory, etc., that can be employed to store information on the remote component(s) 910 side of communication framework 990. Similarly, local component(s) 920 can be operably connected to one or more local data store(s) 994, that can be employed to store information on the local component(s) 920 side of communication framework 990. As examples, AP slice information, RAN slice information, BH slice information, core slice information, etc., UE or other device information, e.g., 206, 306, 506, etc., backhaul preference information via backhaul preference component 352, user preference information 508, etc., or other information that can facilitate adaptive grouping of an access point slice with a RAN slice, BH slice, core slice, or combination thereof.

Figure 10:
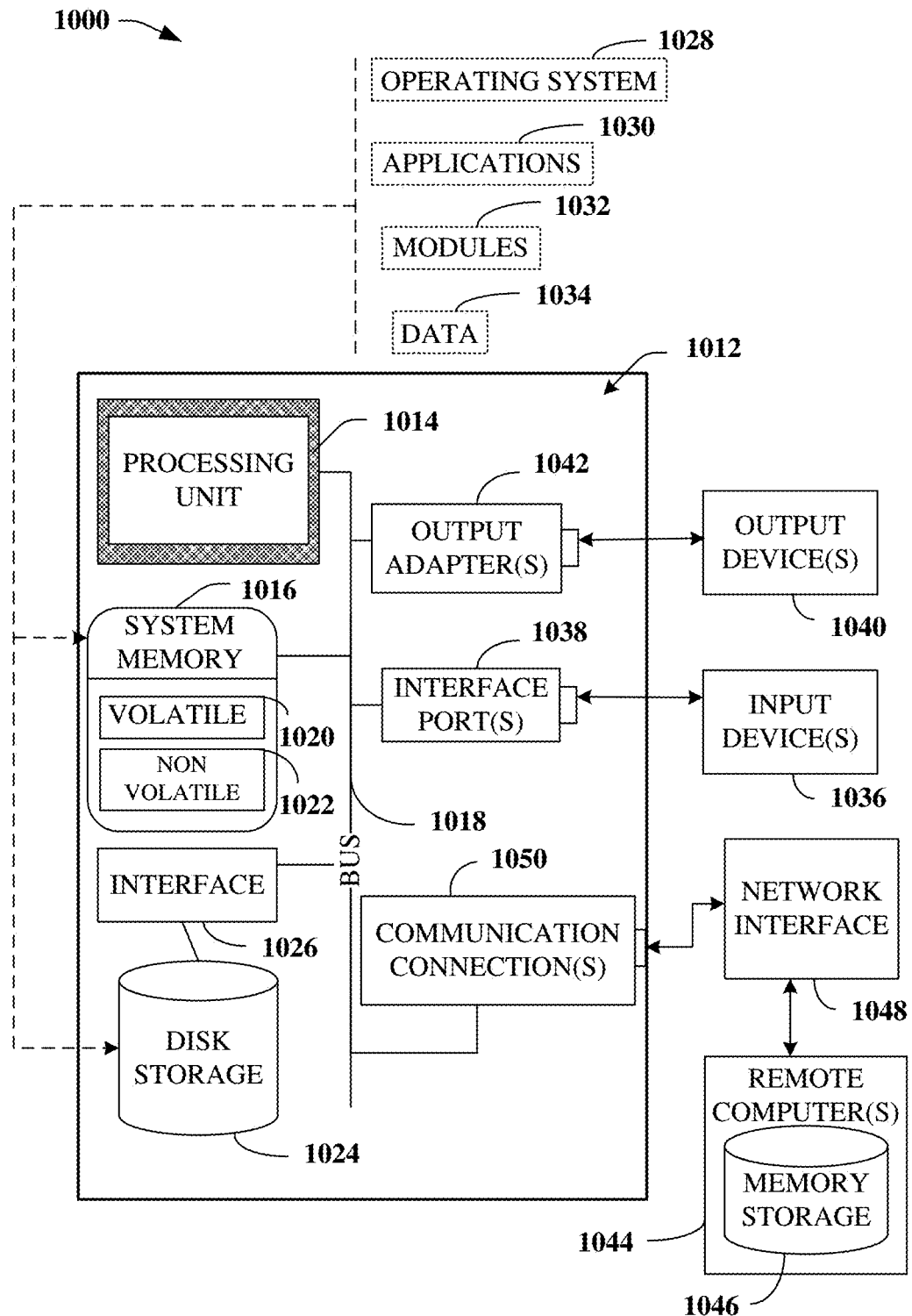
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in network core component 110-510, etc., RAN component 120, 320-520, etc., BSC 292, 392-396, 492, 592, etc., AP component 120-520, etc., data store(s) 592, 992, 994, etc., UE 102, 104, etc., or any other component that is located local with another component of systems 100-500, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random-access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory, or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory, or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries, or other data retrieval protocols, for a variety of operations with respect to the information stored by the medium. As such, for example, a computer-readable medium can comprise executable instructions stored thereon that, in response to execution, can cause a system comprising a processor to perform operations comprising selecting an access point slice based on a device connection parameter to an end point device. The operations can further comprise synchronizing a network core slice with the access point slice, synchronizing a backhaul network slice with the access point slice, and, in response to changes in the connection parameter between the end point device and the access point device, adapting the access point slice and updating the synchronization to the network core slice and backhaul network slice.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line-controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring, and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); sixth generation partnership project (6G or 6GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (λ) for millimeter waves is typically in the 1-mm to 10-mm range.

The term "infer", or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices, and drawings such terms are intended to be inclusive in a manner similar to the term "comprising" as "comprising" is interpreted when employed as a transitional word in a claim.

What is claimed is:
1. A device, comprising:
a processor; and
a memory that stores executable instructions that, when executed by the processor, facilitate performance of operations, comprising:
generating an access point slice based on a device connection request;
coordinating the access point slice with a network core slice;
coordinating the access point slice with a backhaul network slice, wherein an access point is connected to a network core via a backhaul network;
provisioning a slice group based on the access point slice, the network core slice, and the backhaul network slice, wherein the provisioning the slice group further comprises provisioning the slice group such that the access point slice, the network core slice and the backhaul network slice employ corresponding network resources in an end-to-end network; and
in response to a change in a performance parameter of the device connection request:
updating the access point slice,
updating the coordinating of the access point slice with the network core slice, and
updating the coordinating of the access point slice with the backhaul network slice.
2. The device of claim 1, wherein the device connection request indicates information selected from a group of information comprising a device type identifier, a service identifier, an application identifier, a key performance metric threshold, a user identifier, and a location identifier.

3. The device of claim 1, wherein the access point slice corresponds to a portion of computing resources of a wireless local area network component.

4. The device of claim 3, wherein the wireless local area network component employs an Institute of Electrical and Electronics Engineers 802.11 standard.

5. The device of claim 1, wherein coordinating the access point slice with the network core slice results in the access point slice supporting a same virtual network function as is supported by the network core slice.

6. The device of claim 1, wherein the operations further comprise coordinating the access point slice with a radio access network slice.

7. The device of claim 6, wherein coordinating the access point slice with the radio access network slice facilitates a handover operation that migrates a device corresponding to the device connection request from an access point device corresponding to the access point slice to a radio access network device corresponding to the radio access network slice.

8. The device of claim 6, wherein coordinating the access point slice with the radio access network slice facilitates a handover operation that migrates a device corresponding to the device connection request from a radio access network device corresponding to the radio access network slice to an access point device corresponding to the access point slice.

9. The device of claim 1, wherein the generating the access point slice based on the device connection request comprises inferring a usage of an access point device corresponding to the access point slice.

10. The device of claim 9, wherein inferring the usage anticipates receiving the device connection request.

11. The device of claim 10, wherein a result of the inferring is employed to predetermine a potential access point slice based on anticipating, according to a threshold likelihood, receiving the device connection request.

12. A method, comprising:
provisioning, by a system comprising a processor, an access point slice from computing resources of an access point device, wherein computing resources embodied via the access point slice are selected based on a connection request of a user equipment;
causing, by the system, provisioning of a network core slice that is coordinated with the access point slice;
causing, by the system, provisioning of a backhaul network slice that is coordinated with the access point slice, wherein an access point is connected to a network core via a backhaul network;
provisioning a slice group such that the access point slice, the network core slice and the backhaul network slice employ corresponding network resources in an end-to-end network; and
updating, by the system, the access point slice based on changes to a performance of a connection between the user equipment and the access point device.

13. The method of claim 12, further comprising causing, by the system, provisioning of a radio access network slice that is coordinated with the access point slice to facilitate migrating the user equipment between a radio access network device and the access point device.

14. The method of claim 12, wherein provisioning the access point slice comprises provisioning a virtual network function.

15. The method of claim 12, wherein provisioning the access point slice comprises provisioning radio spectrum corresponding to an Institute of Electrical and Electronics Engineers 802.11 spectrum.

16. The method of claim 12, wherein the provisioning comprised determining an inference of computing resource usage by the access point device.

17. A non-transitory machine-readable storage medium, comprising executable instructions that, when executed by a processor, facilitate performance of operations, comprising:
selecting an access point slice of an access point device, wherein the access point slice is selected based on a connection parameter corresponding to a connection between the access point device and an end point device;
synchronizing a network core slice with the access point slice;
synchronizing a backhaul network slice with the access point slice, wherein an access point is connected to a network core via a backhaul network;
provisioning a slice group such that the access point slice, the network core slice and the backhaul network slice employ corresponding network resources in an end-to-end network; and
in response to changes in the connection parameter between the end point device and the access point device, adapting the access point slice, updating the synchronizing to the network core slice, and updating the synchronizing to the backhaul network slice.

18. The non-transitory machine-readable storage medium of claim 17, wherein the operations further comprise synchronizing a radio access network slice of a radio access network device with the access point slice to facilitate migrating the end point device between the radio access network device and the access point device.

19. The non-transitory machine-readable storage medium of claim 17, wherein the access point device is comprised in a wireless local area network.

20. The non-transitory machine-readable storage medium of claim 19, wherein the network core slice corresponds to a wireless public wide area network.

* * * * *